US012644950B2

(12) United States Patent
Fahim et al.

(10) Patent No.: US 12,644,950 B2
(45) Date of Patent: *Jun. 2, 2026

(54) BACKSCATTER-BASED POSITIONING

(71) Applicant: QUALCOMM Incorporated, San Diego, CA (US)

(72) Inventors: Mohammad Tarek Fahim, San Diego, CA (US); Srinivas Yerramalli, San Diego, CA (US); Xiaojie Wang, Hillsborough, NJ (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

This patent is subject to a terminal disclaimer.

(21) Appl. No.: 18/060,418

(22) Filed: Nov. 30, 2022

(65) Prior Publication Data

US 2024/0175963 A1     May 30, 2024

(51) Int. Cl.
*G01S 5/00* (2006.01)
*H04L 5/00* (2006.01)
*H04W 24/10* (2009.01)

(52) U.S. Cl.
CPC .......... *G01S 5/0036* (2013.01); *H04L 5/0051* (2013.01); *H04W 24/10* (2013.01)

(58) Field of Classification Search
CPC ...... G01S 5/0036; G01S 5/0268; G01S 7/006; G01S 13/765; G01S 13/878; H04L 5/0051; H04W 24/10; H04W 84/18; H04W 4/029; H04W 4/80; H04W 64/00
See application file for complete search history.

(56) References Cited

U.S. PATENT DOCUMENTS

| | | | | |
|---|---|---|---|---|
| 8,207,820 B2* | 6/2012 | Bauchot | .................. | H04Q 9/00 |
| | | | | 700/226 |
| 10,218,471 B1* | 2/2019 | Kumar | ................ | H04L 27/2601 |
| 2009/0079633 A1* | 3/2009 | Ward | ........................ | G01S 5/12 |
| | | | | 342/465 |
| 2013/0113610 A1* | 5/2013 | Carrender | ................ | H01Q 3/44 |
| | | | | 340/10.1 |

(Continued)

FOREIGN PATENT DOCUMENTS

WO     WO-2022200673 A1     9/2022

OTHER PUBLICATIONS

International Search Report and Written Opinion—PCT/US2023/075957—ISA/EPO—Feb. 7, 2024.

(Continued)

*Primary Examiner* — Kabir A Timory
(74) *Attorney, Agent, or Firm* — QUALCOMM Incorporated

(57) ABSTRACT

This disclosure provides systems, methods, and devices for wireless communication that support backscatter-based positioning. In a first aspect, a method of wireless communication includes receiving multiple measurement reports associated with a tag device. The multiple measurement including, for each transmission/reception point (TRP) of multiple TRPs, a measurement report of the TRP. The method further includes determining, based on the multiple measurement reports, a position of the tag device having a tag delay that is unknown to a network entity.

29 Claims, 8 Drawing Sheets

(56) References Cited

U.S. PATENT DOCUMENTS

| 2014/0035732 A1* | 2/2014 | Karr .................. G06K 7/10069 |
| | | 340/10.5 |
| 2018/0048444 A1* | 2/2018 | Park ...................... H04L 5/0053 |
| 2020/0259896 A1 | 8/2020 | Sachs et al. |
| 2020/0266942 A1* | 8/2020 | Akkarakaran ...... H04W 36/322 |
| 2023/0296722 A1* | 9/2023 | Shrestha .............. G01S 5/0269 |
| | | 455/456.1 |
| 2024/0163840 A1* | 5/2024 | Säily .................. H04L 25/0222 |
| 2024/0176011 A1 | 5/2024 | Fahim et al. |

OTHER PUBLICATIONS

OPPO: "Positioning Technologies for Rel-19 Ambient IoT", 3GPP RAN-Release 19 workshop, RWS-2300317, 3rd Generation Partnership Project, Mobile Competence Centre, 650, Route Des Lucioles, F-06921 Sophia-Antipolis Cedex, France, No. Taipei, Jun. 15, 2023-Jun. 16, 2023, Jun. 11, 2023, XP052510056, 15 pages.

* cited by examiner

800

802

Receive multiple measurement reports associated with a tag device, the multiple measurement reports including, for each transmission/reception point (TRP) of multiple TRPs, a measurement report of the TRP

804

Determine, based on the multiple measurement reports, a position of the tag device having a tag delay that is unknown to the network entity

BACKSCATTER-BASED POSITIONING

TECHNICAL FIELD

Aspects of the present disclosure relate generally to wireless communication systems, and more particularly, to backscatter-based positioning. Some features may enable and provide improved communications, including reduced control overhead, efficient resource utilization, improved network access, improved ranging measurements, location determinations, TRP selection, reduced interference, or a combination thereof.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Radio frequency identification (RFID) systems and devices typically include a reading device, called a reader, and one or more tag devices—e.g., RFID tag devices. A tag device typically includes a wireless microchip used to tag an object for automated identification. However, the use of tag devices has not been has not been applied to current 3GPP technologies and Internet-of-Things (IOT) implementations that may include identification, monitoring, positioning, and tracking, as illustrative, non-limiting examples. Additionally, tag devices can vary in individual capacities and components. Accordingly, use of tag devices applied to current 3GPP technologies, such as coexistence with user equipments (UEs), and infrastructure in frequency bands for current 3GPP technologies has yet to be established. Given the low power and limited processing capabilities of different types of tag devices, incorporation of tag devices with 3GPP technologies presents a variety of complex and technical challenges, such as limiting network congestion, overhead, and interference associated with the use of tag devices with 3GPP technologies.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is performed by a network entity. The method includes receiving multiple measurement reports associated with a tag device. The multiple measurement reports include, for each transmission/reception point (TRP) of multiple TRPs, a measurement report of the TRP. The method also includes determining, based on the multiple measurement reports, a position of the tag device having a tag delay that is unknown to the network entity.

In an additional aspect of the disclosure, an apparatus includes at least one processor and a memory coupled to the at least one processor. The at least one processor is configured to receive multiple measurement reports associated with a tag device. The multiple measurement reports include, for each TRP of multiple TRPs, a measurement report of the TRP. The at least one processor is further configured to determine, based on the multiple measurement reports, a position of the tag device having a tag delay that is unknown to the network entity.

In an additional aspect of the disclosure, an apparatus includes a communication interface configured to receive multiple measurement reports associated with a tag device. The multiple measurement reports include, for each TRP of multiple TRPs, a measurement report of the TRP. The apparatus further includes a at least one processor coupled to a memory storing processor-readable code, the at least one processor configured to execute the processor-readable code to cause the at least one processor to determine, based on the multiple measurement reports, a position of the tag device having a tag delay that is unknown to the network entity.

In an additional aspect of the disclosure, an apparatus includes means for receiving multiple measurement reports associated with a tag device. The multiple measurement reports include, for each TRP of multiple TRPs, a measurement report of the TRP. The apparatus further includes means for determining, based on the multiple measurement reports, a position of the tag device having a tag delay that is unknown to the network entity.

In an additional aspect of the disclosure, a non-transitory computer-readable medium stores instructions that, when executed by a processor, cause the processor to perform operations. The operations include receiving multiple measurement reports associated with a tag device. The multiple measurement reports include, for each TRP of multiple TRPs, a measurement report of the TRP. The operations further include determining, based on the multiple measurement reports, a position of the tag device having a tag delay that is unknown to the network entity.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
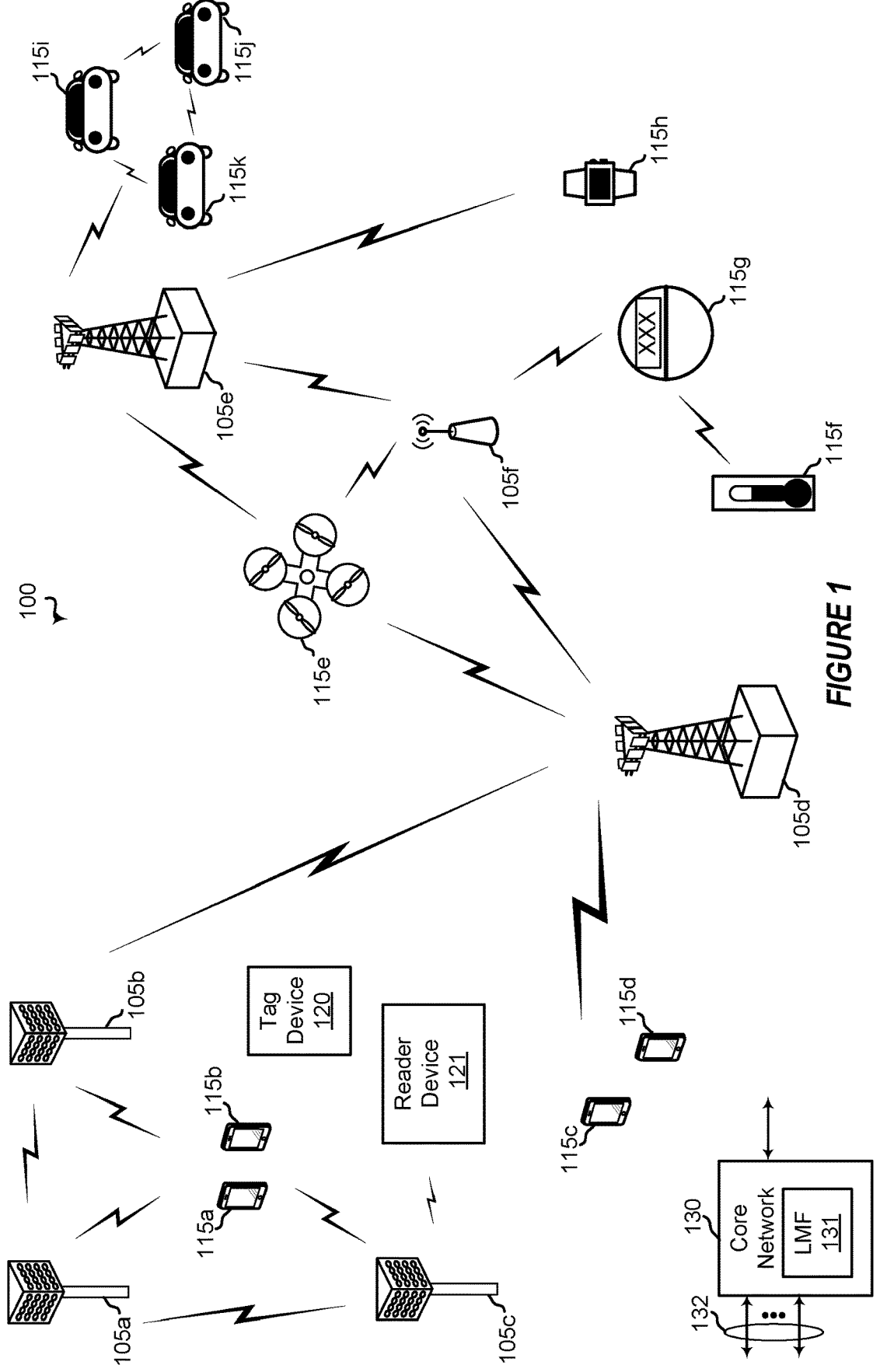
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support backscatter-based. For example, the present disclosure describes positioning of a tag device, such as a passive Internet-of-Things (IOT) device or other type of tag device, through backscatter transmission. A location management function (LMF) of a core network may be configured to determine a position, such as a two-dimensional position or a three-dimensional position, of a tag device based on one or more measurement reports received from one or more transmission/reception points (TRPs). To illustrate, the LMF may identify a tag device, such as a passive tag device or a semi-passive tag device, for positioning and configure multiple TRPs for a tag device positioning session. For example, the LMF may configured one or more TRPs to send a respective positioning reference signal (PRS) and receive a respective backscatter signal. In some implementation, each of the one or more TRPs is configurable for full-duplex operation, are asynchronous, or a combination thereof.

The LMF may receive receiving multiple measurement reports associated with the tag device. For example, the multiple measurement reports may include, for each TRP of multiple TRPs, a measurement report of the TRP. The LMF may determine, based on the multiple measurement reports, a position of the tag device having a tag delay that is unknown to the LMF. The tag delay may include a radio frequency group delay of one or more components of the tag device. To determine the position, the LMF may determine a group of time difference values based on the multiple measurement reports. To illustrate, the multiple TRPs including a reference TRP and a group of TRPs, and the LMF may determine, for each TRP of the multiple TRPs, a measurement value based on the measurement report of the TRP. To determine the group of time difference values, the LMF may, for each TRP of the group of TRPs, subtract the measurement value of the reference TRP from the measurement value of the TRP to determine a difference value, and divide the difference value two to determine a quotient, the quotient includes a time different value of the group of time difference values. The LMF may calculate the position of the tag device based on the group of time difference values using a time difference of arrival technique.

Particular implementations of the subject matter described in this disclosure may be implemented to realize one or more of the following potential advantages or benefits. In some aspects, the present disclosure provides techniques for supporting backscatter-based. The techniques described facilitate determining a position, such as a two dimensional or a three dimensional position, of a tag device that has limited on-board power and computational resources, such as a passive tag device or a semi-passive tag device. To illustrate, the LMF is able to provide a TRP configuration (e.g., PRS configuration) to one or more TRPs that accounts for particular characteristics of the tag device, such as limited on-board power or computational resources of the tag device. Additionally, the LMF is able to determine a position of tag device based on one or more measurement reports when a tag delay of tag device is unknown or unavailable. For example, the LMF may perform TDoA backscatter-based positioning based measurements of multiple TRPS when the tag delay of the tag device is unknown or unavailable to the LMF—e.g., unknown or unavailable to device that calculates the position of the tag device.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHZ-7.125 GHZ) and FR2 (24.25 GHZ-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of sub-carrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHZ, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mm Wave components at a TDD of 28 GHZ, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (cMTC), narrowband IoT (NB-IOT) and the like. UEs 115c-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105c.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a Location Management Function (LMF) 131, which is an entity in the 5G Core Network (5GC) supporting various functionality, such as managing support for different location services for one or more UEs. For example the LMF 131 may include one or more servers, such as multiple distributed servers. Base stations 105 may forward location messages to the LMF 131 and may communicate with the LMF via a NR Positioning Protocol A (NRPPa). The LMF 131 is configured to control the positioning parameters for UEs 115 and the LMF 131 can provide information to the base stations 105 and UE 115 so that action can be taken at UE 115. In some implementations, UE 115 and base station 105 are configured to communicate with the LMF 131 via an Access and Mobility Management Function (AMF).

Tag device systems typically include a tag device 120 and a reader device 121. Tag device 120 includes radio frequency identification (RFID) device or tags that include a wireless microchip used for tagging objects for automated object identification. Reader device 121, such as an RFID reader, may be configured to transmit electromagnetic signals to other devices, such as tag device 120. Reader device 121 may include one or more processors and a memory and is typically able to process data. Additionally, reader device 121 usually includes one or more transmitters and receivers. During typical operation, reader device 121 may be configured to transmit a signal, which is receivable by tag device 120 and to receive and process a signal from tag device 120 that is responsive to the transmitted signal.

Tag devices, such as tag device 120, are categorized based on functionality or capability. For instance, tag device 120 may be categorized as one of a passive tag, a semi-passive tag, and an active tag depending on the functionality or capabilities of tag device 120. Accordingly, tag device 120 may correspond to a passive tag, a semi-passive tag, or an active tag.

Passive tags typically lack a power source, harvest energy from ambient electromagnetic signals, and have limited computational capacity, often lacking components, such as analog to digital converters (ADCs) and digital to analog converters (DACS) for signal processing. Since passive tags generally lack signal processing capability, passive tags typically include a simple circuit to reflect a received electromagnetic signal to the environment in the form of a backscatter transmission. For instance, reader device 121 may transmit an electromagnetic signal that a passive tag, such as tag device 120, may receive and at least partially reflect in the form of a backscatter signal. To elaborate, if tag device 120 is a passive tag then tag device 120 may include circuitry to at least partially reflect non-absorbed portions of electromagnetic signals received from the ambient environment, such as transmitted by reader device 121, in the form of a backscatter transmission.

Semi-passive tags usually include an on-board power source to provide energy for on-board electronic components. In general, semi-passive tags often have more computational power than passive tags. Additionally, semi-passive tags may have a limited on-board power source; however, semi-passive tags typically transmit signals through backscatter transmissions as explained above in the context of passive tags.

Active tags often include an on-board power source and more computational capacity than passive or semi-passive tags. Moreover, unlike passive and semi-passive tags that normally are unable to transmit unless a reader device, such as reader device 121, is in proximity to them, active tags are able to transmit regardless of a proximity of a reader device. Active tag devices typically include signal processing functionality, such as ADCs, DACs, and the like. Moreover, active tags often include a power source and are able to actively transmit. In particular, unlike passive and semi-passive tags that generate a backscatter signal by at least partially reflecting a transmission received from a reader device (e.g., reader device 121), active tags are capable of transmitting independently of a signal received from another device, such as reader device 121.

Additionally, tag devices, such as tag device 120, typically include a tag identification to uniquely identify the tag device. Accordingly, a tag device, such as tag device 120, may include its unique tag identification in response to receipt, at the tag device, of a transmission from reader device 121. If tag device 120 corresponds to a passive tag or a semi-passive tag, tag device 120 may be configured to at least partially reflect the transmission received from reader device 121 in the form of a backscatter signal that is readable by reader device 121. While an active tag is able to process a transmitted signal received from reader device 121, in some implementations, an active tag device may also partially reflect the received signal as a backscatter signal or may independently transmit a signal to reader device 121 in response to a signal received from reader device 121.

Tag device systems that include tag device 120 and reader device 121 may be deployed for positioning an object associated with tag device 120. For instance, tag device 120 may be affixed to an object, and reader device 121 may be configured to identify a position (e.g., a two-dimensional position, a three-dimensional position) of the object to which tag device 120 is affixed through use of backscatter-based positioning. As such, tag device systems can be deployed in a wide range of applications in which precise and accurate object positioning achieved. These applications may include automated checkout, medical application such as monitoring patients' compliance with medical directives, and law enforcement and security applications, as illustrative, non-limiting examples.

Figure 2:
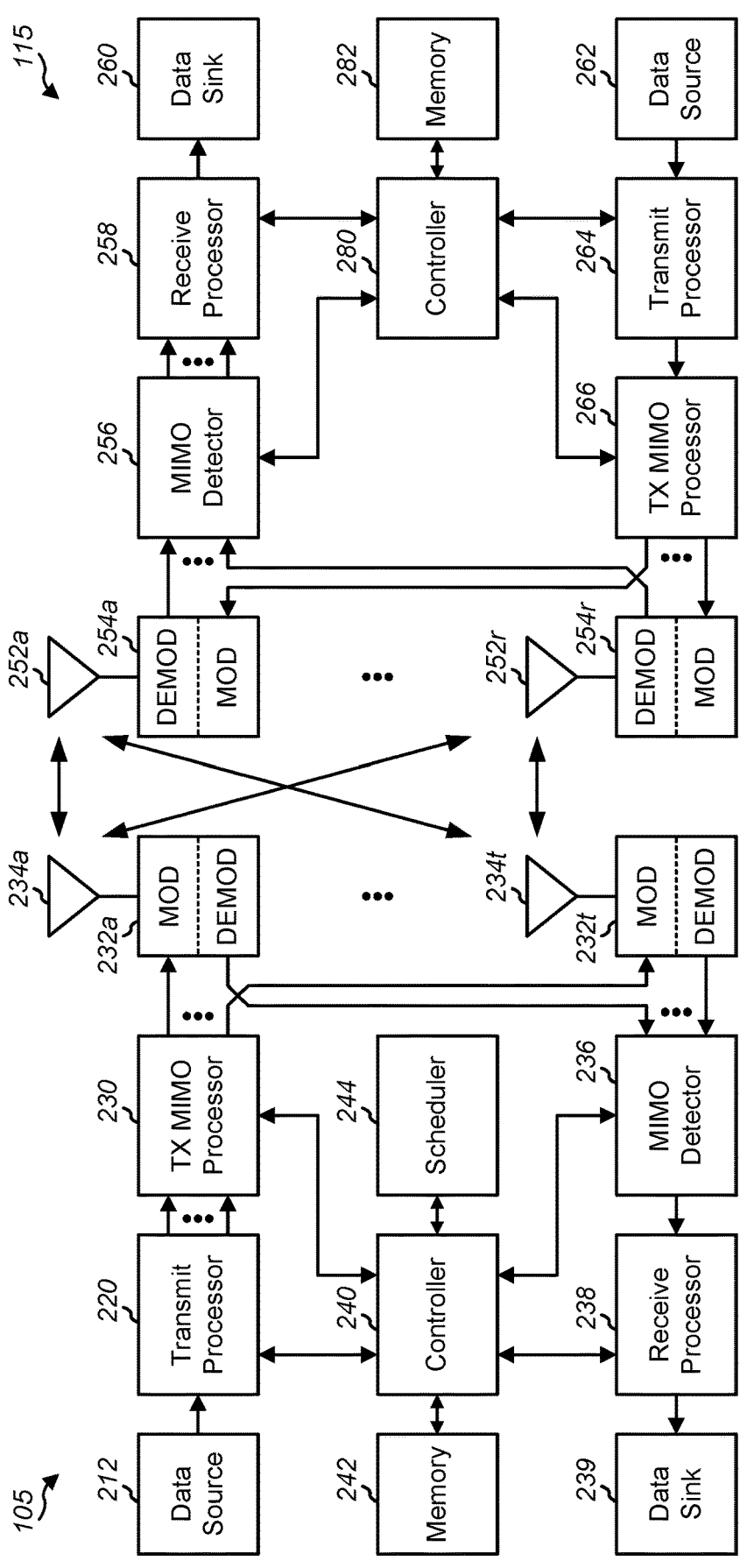
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc.

The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 8, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
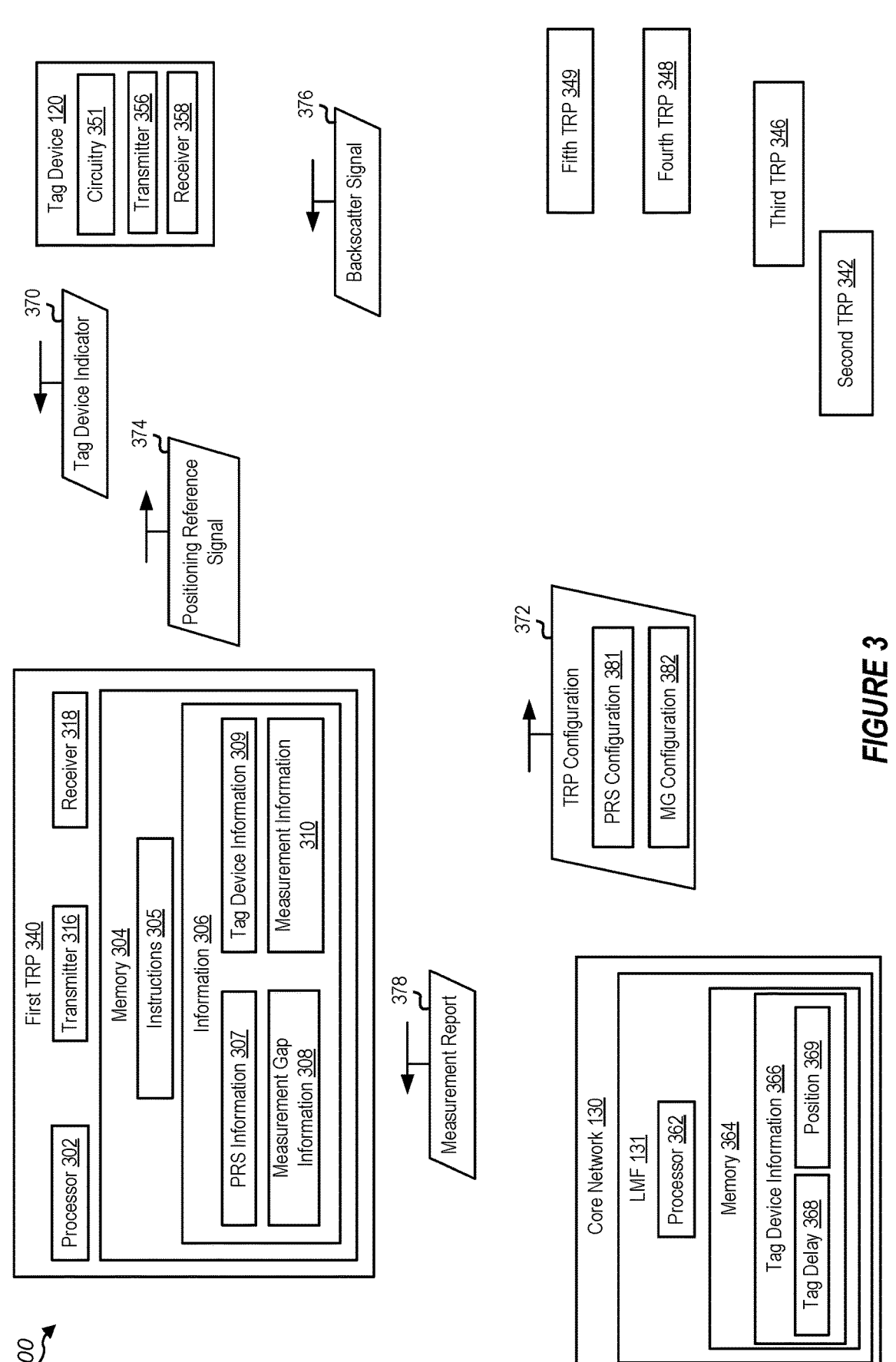
FIG. 3 is a block diagram illustrating an example wireless communication system that supports backscatter-based positioning according to one or more aspects.

FIG. 3 is a block diagram of an example wireless communications system 300 that supports backscatter-based positioning according to one or more aspects. In some examples, wireless communications system 300 may implement aspects of wireless network 100. Wireless communications system 300 includes tag device 120, a first TRP 340, a second TRP 342, a third TRP 346, a fourth TRP 348, a fifth TRP 349, and core network 130. Although five TRPs are illustrated, in some other implementations, wireless communications system 300 may generally include fewer or more than five TRPs.

Tag device 120 may be a RFID tag device. Additionally, tag device 120 may be a passive tag having no power source and limited computational capacity, a semi-passive tag having a limited power source and computational capacity that is equal to or more extensive than the computational capacity of a passive tag device, or an active tag, having a power source and the same or more extensive computational capacity as that the semi-passive tag device. In some imp Tag device 120 may include a variety of components (such as structural, hardware components) used for carrying out one or more functions described herein. For example, these components may include circuitry 351, transmitter 356, and receiver 358. Circuitry 351 may include or correspond to energy harvesting circuitry, a microcontroller, one or more processors, a memory, an analog-to-digital converter (ADC), a digital to analog converter (DAC), or any combination thereof, as non-illustrative examples. Circuitry 351 may depend on whether tag device 120 is a passive tag, a semi-passive tag, or an active tag.

Transmitter 356 is configured to transmit backscatter signal 376, data, or both to one or more other devices (e.g., one or more TRPs or reader device 121), and receiver 358 is configured to receive PRS 374 and data from one or more other devices (e.g., one or more TRPs, reader device 121, core network 130). For example, transmitter 356 may transmit backscatter signal 376 to one or more TRPs, and receiver 358 may receive PRS 374 from one or more TRPs. In some implementations, transmitter 356 and receiver 358 may be integrated in one or more transceivers. Additionally or alternatively, transmitter 356 or receiver 358 may include or correspond to one or more components of tag device 120.

Tag device 120 may have a tag delay. The tag delay, such as a radio frequency (RF) group delay, may include or be based on one or more components (e.g., circuitry 351, transmitter 356, receiver 358, or a combination thereof, of the tag device. The one or more components are configured to receive a positioning reference signal, generate a backscatter signal based on the positioning reference signal, and transmit the backscatter signal. In some implementations, the tag delay is an amount of time between tag device 120 receiving a positioning reference signal and transmitting a backscatter signal based on the received positioning reference signal.

In some implementations, tag device 120 is configured to generate a tag device indicator 370. Tag device indicator 370 may indicate a tag capability or tag parameter of tag device 120. The tag capability or the tag parameter may include or correspond to a tag ID, a tag type, a tag delay, a bandwidth, a positioning reference signal slot periodicity, a sensitivity, an energy harvesting capability (e.g., energy harvesting information), an energy level of tag device 120, or a combination thereof. The energy harvesting capability may include or correspond to a charging rate, an energy state, an energy discharging rate, an energy harvesting type (e.g., solar, vibrational, thermal, or RF), or a combination thereof. In some implementations, tag device 120 does not know its tag delay or may not be configured to support tag delay reporting of its tag delay.

Tag device 120 may include one or more components as described herein with reference to tag device 120. In some implementations, tag device 120 is a 3GPP-capable tag device, an LTE-capable tag device, a 5G-capable tag device, a 6G-capable tag device, or a combination thereof.

First TRP 340 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316

(hereinafter referred to collectively as "transmitter 316"), and one or more receivers 318 (hereinafter referred to collectively as "receiver 318"). In some implementations, first TRP 340 may include an interface (e.g., a communication interface) that includes transmitter 316, receiver 318, or a combination thereof. Processor 302 may be configured to execute instructions 305 stored in memory 304 to perform the operations described herein. In some implementations, processor 302 includes or corresponds to one or more of receive processor 238, transmit processor 220, and controller 240, and memory 304 includes or corresponds to memory 242 as described with reference to base station 105 of FIG. 2.

Memory 304 includes or is configured to store instructions 305 and information 306. Information 306 may include PRS information 307, measurement gap information 308, tag device information 309, and measurement information 310.

PRS information 307 includes information that first TRP 340 uses to generate a positioning reference signal (PRS) 374. For example, PRS information 307 may include one or more parameters, such a repetition rate, a bandwidth configuration, a comb pattern configuration, or any combination thereof. The repetition rate may include or indicate a number of times within a time period that a PRS is transmitted. The comb pattern may include or indicate a configurable resource block allocation. In some implementations, PRS information 307 may be generated or stored based on a TRP configuration (e.g., 372) or a PRS configuration (e.g., 381).

Measurement gap information 308 indicates one or more time periods associated with a positioning session of tag device 120. For example, measurement gap information 308 may indicate one or more time periods during which one or more TRPs are configured to monitor for PRS 374, backscatter signal 376, or a combination thereof. Additionally, or alternatively, measurement gap information 308 may indicate a time period for one or more TRPs to generate a measurement report (e.g., 378), transmit the measurement report, or a combination thereof. In some implementations, measurement gap information 308 may indicate a time period during with the one or more TRPs are to refrain from transmitting signals, such as PRS 374. For example, measurement gap information 308 may indicate a time period during which first TRP 340 refrains from scheduling one or more transmission to occur. Measurement gap information 308 may be based on a TRP configuration (e.g., 372) or a measurement gap (MG) configuration 382.

Tag device information 309 includes or corresponds to information or characteristics about one or more tag devices, such as tag device 120. For example, tag device information 309 may include, for a tag device, a tag type, a bandwidth, a PRS slot periodicity, a sensitivity, a tag delay (e.g., a group delay), or a combination thereof. A tag type may correspond to whether the tag device (e.g., tag device 120) is a passive tag, a semi-passive tag, or an active tag. Additionally, or alternatively, the tag type may indicate a technology or use of the tag device, such as a surface acoustic wave (SAW) tag device, an IoT tag device, a security tag device, a medical tag device, or a combination thereof. Bandwidth may correspond to a bandwidth over which tag device 120 is capable of communicating. PRS slot periodicity may correspond to timeframes during which or how often tag device 120 expects to receive PRS 374. Sensitivity may correspond to a sensitivity of tag device 120 to PRS 374, such as transmit power of the PRS, a distance from a TRP at which tag device 120 can successfully receive a signal, or a combination thereof. The tag delay may correspond to an amount of time for the tag device 120 to process PRS 374 and to generate backscatter signal 376 in response to receipt, at tag device 120, or PRS 374. In some implementations, one or more characteristics, such as the tag delay, of the tag device 120 may be unknown or unavailable to first TRP 340.

Measurement information 310 includes or corresponds to propagation times associated with a positioning reference signal (e.g., 374), a backscatter signal (e.g., 376), or a combination thereof. For example, when first TRP 340 is configured as a Tx TRP, measurement information 310 may include a transmit time of PRS 374, a receive time of backscatter signal 376, an amount of time that elapses from transmission of PRS 374 to receipt of backscatter signal 376, or a combination thereof. In some implementations when first TRP is configured as an Rx TRP, measurement information 310 may include a receive time of PRS 374, a receive time of backscatter signal 376, an amount of time that elapses from receipt of PRS 374 to receipt of backscatter signal 376, or a combination thereof. In some implementations, measurement information 310 may include or indicate a receive time of a backscatter signal (e.g., 376), a transmit time of a positioning reference signal (e.g., 374) transmitted after receipt of the backscatter signal, an amount of time that elapses from receipt of the backscatter signal to transmission of the positioning reference signal, or a combination thereof. First TRP 340 may be configured to generate a measurement report based on measurement information 310.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, core network 130, another TRP, or a network entity. Additionally, or alternatively transmitter 316 may transmit a first signal, such as a positioning reference signal (e.g., 374), and receiver 318 may receive a second signal, such as a backscatter signal (e.g., 376). In some implementations, transmitter 316 and receiver 318 may be integrated in one or more transceivers. Additionally or alternatively, transmitter 316 or receiver 318 may include or correspond to one or more components of as described with reference to UE 115 or base station 105 of FIG. 2. In some implementations, transmitter 316 and receiver 318 may be configured to operate in a full duplex mode. For example, first TRP 340 may include a first panel for transmitter 316 and a second panel for receiver 318. In some other implementations, first TRP 340 may not be configurable in full duplex mode.

In some implementations, first TRP 340 may include one or more antenna arrays. The antenna array may include multiple antenna elements configured to perform wireless communications with other devices, such as with core network 130, another TRP, or tag device 120. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam. In some implementations, first TRP 340 may be configured as or include a reader device (e.g., 120), such as an RFID reader device.

Second TRP 342, third TRP 346, fourth TRP 348, and fifth TRP 349 may include or correspond to first TRP 340. For example, second TRP 342, third TRP 346, fourth TRP 348, or fifth TRP 349 may include one or more similar components as first TRP 340, may be configured to perform one or more operations as described with reference to first TRP 340, or a combination thereof. In some implementations, first TRP 340, second TRP 342, third TRP 346, fourth TRP 348, or fifth TRP 349 may include or correspond to reader device 121. In some implementations, first TRP 340, second TRP 342, third TRP 346, fourth TRP 348, and fifth TRP 349 may be synchronized, such as time synchronized. For example, multiple TRPs may be configured to enable TDOA or TOA backscatter positioning of tag device 120 by LMF 131. In other implementations, one or more TRP of first TRP 340, second TRP 342, third TRP 346, fourth TRP 348, and fifth TRP 349 may be unsynchronized with another TRP of first TRP 340, second TRP 342, third TRP 346, fourth TRP 348, and fifth TRP 349.

Core network 130 may include a 3GPP core network, a 4G core network, a 5G core, or an evolved packet core (EPC). Core network 130 may be coupled, such as communicatively coupled, to one or more network entities, such as TRP 340, 342, 346, 348, or 349. Core network 130 may include or correspond to LMF 131.

Although shown and described as being included in core network 130, LMF 131 may be distinct from core network 130 in some implementations. For example the LMF 131 may include one or more servers, such as multiple distributed servers. LMF 131 may be configured to support various functionality, such as managing support for different location services for one or more UEs, one or more tag devices, or one or more network entities. For example, LMF 131 is configured to control the positioning parameters for TRP 340, 342, 346, 348, or 349 or tag device 120 and LMF 131 can provide information to TRP 340, 342, 346, 348, or 349 or tag device 120 so that an action or an operation can be taken or performed at TRP 340, 342, 346, 348, or 349. TRPs 340, 342, 346, 348, or 349, such as base station 105 or reader device 121, may communication information to the LMF 131 and may communicate with the LMF 131 via a protocol, such as a NR Positioning Protocol A (NRPPa). In some implementations, TRP 340, 342, 346, 348, or 349, tag device 120, or combinations thereof are configured to communicate with the LMF 131 via an Access and Mobility Management Function (AMF).

In some implementations, LMF 131 is configured to support backscatter-based positioning. Accordingly, LMF 131 may include one or more processors 362 (hereinafter referred to collectively as "processor 362") and one or more memory devices 364 (hereinafter referred to collectively as "memory 364") storing instructions, executable by processor 362, to perform operations described herein. Additionally, memory 364 may be configured to store tag device information 366. Tag device information 366 may include tag delay 368 and a position 369. In some implementations, tag delay 368 of tag device 120 is unknown or unavailable to LMF 131. In such implementations, memory 364 may not store tag delay 368 or may store a predetermined value, such as a null value, to indicate that tag delay 368 is unknown or unavailable.

To support backscatter-based positioning, LMF 131 may be configured to perform on or more operations. These functions may include generation of TRP configuration 372 and transmission of TRP configuration 372 to one or more TRPs (e.g., 340, 342, 346, 348, or 349). Additionally, LMF 131 may be configured to generate PRS configuration 381, measurement gap (MG) configuration 382, or a combination thereof. In some implementations, LMF 131 may be configured to receive one or more measurement reports (hereinafter referred to collectively as "measurement report 378") generated by one or more TRPs (e.g., 340, 342, 346, 348, 349). In some implementations, LMF 131 is configured to determine position 369 of tag device 120 based on measurement report 378. For example, LMF 131 is configured to determine position 369 of tag device 120 without knowing tag delay 368.

LMF 131 may be configured to determine a position of tag device 120 based on multiple measurement reports (referred to collectively as "measurement report 378") and without knowing tag delay 368 corresponding to tag device 120. Determining position 369 of tag device 120 may include calculating the position based on a TDoA technique. The position may be a 2D position or a 3D position. Moreover, LMF 131 may be configured to use position 369 for one or more operations, or transmit a position indicator that indicates position 369 of tag device 120.

In some implementations, wireless communications system 300 implements a 5G NR network. For example, wireless communications system 300 may include multiple 5G-capable devices, such as UEs and base stations configured to operate in accordance with a 5G NR network protocol such as that defined by the 3GPP. In some other implementations, wireless communications system 300 implements a 6G network.

During operation of wireless communications system 300, LMF 131 may identify tag device 120 for a positioning session. For example, LMF 131 may receive tag device indicator 370 that indicates a tag capability of tag device 120. In some implementations. LMF 131 may transmit a request to tag device 120 for the tag capability and tag device 120 may send tag device indicator 370 responsive to the request. Additionally, or alternatively, tag device indicator 370 may be received by core network 130, LMF 131, one or more TRPs 340-348, or a combination thereof. Tag device indicator 370 may include or indicate one or more capabilities or parameters of tag device 120. In some implementations, tag device indicator 370 may not include or indicate tag delay 368 of tag device 120.

LMF 131 may determine that tag delay 368 is unknown or unavailable to LMF 131. For example, LMF 131 may request tag capabilities (e.g., tag delay 368) and may not receive tag delay 368 from tag device 120.

LMF 131 may generate TRP configuration 372. For example, LMF 131 may generate TRP configuration 372 based on identification of tag device 120 for a positioning session. Accordingly, the TRP configuration 372 may be associated with a positioning session for tag device 120. In some implementations, LMF 131 may generate TRP configuration 372 based on a determination that tag delay 368 is unknown or unavailable. Additionally, or alternatively, LMF 131 may generate TRP configuration 372 based on tag device indicator 370, a tag capability of tag device 120, a parameter (e.g., an energy level) of tag device 120, or a combination thereof. In some implementations, LMF 131 may generate TRP configuration 372 based on one more capabilities of TRPs 340-349. For example, LMF 131 may generate TRP configuration 372 based whether one or more of TRPs are configurable in a full duplex mode, one or more of TRPs of TRPs 340-349 are asynchronous with the other TRPs, or a combination thereof.

TRP configuration 372 may include or indicate a designation of one or more TRPs as a Tx TRP, one or more TRPs as an Rx TRP, or a combination thereof. In some implementations, TRP configuration may identify or indicate a reference TRP, one or more TRP pairs, a full duplex mode or a non-full duplex mode, a measurement report format, or a combination thereof. Additionally, or alternatively, TRP configuration 372 may include PRS configuration 381 and MG configuration 382. PRS configuration 381 may include or indicate information, such as PRS information 307, for one or more TRPs designated as a Tx TRP to transmit a PRS, such as PRS 374. MG configuration 382 may include or indicate information, such as measurement gap information 308, for one or more TRPs designated as the Rx TRP to receive PRS 374, backscatter signal 376, or a combination thereof.

LMF 131 may transmit TRP configuration 372 that is received by one or more of TRPs 340-349. First TRP 340 may transmit PRS 374 based on or according to PRS information 307 (e.g., PRS configuration 381). PRS 374 may be received by tag device 120, one or more TRPs of TRPs 342-349, or a combination thereof.

Tag device 120 may receive PRS 374 and transmit backscatter signal 376 based on PRS 374. For example, tag device 120 may reflect PRS 374 to generate backscatter signal 376. Backscatter signal 376 may be received by one or more TRPs of TRPs 340-349 In some implementations, the one or more TRPs of TRPs 340-349 may receive backscatter signal 376 during a time period indicated by MG configuration 382 (e.g., measurement gap information 308).

The one or more TRPs of TRPs 340-349 that receive backscatter signal 376 may generate a measurement report 378. For example, second TRP 342 may generate measurement report 378 and transmit measurement report 378. In some implementations, such as when first TRP 340 and second TRP 342 are a pair of TRPs, second TRP 342 may transmit its measurement report to first TRP 340. As another example, first TRP 340 may receive backscatter signal 376 and generate its own measurement report (e.g., measurement report 378) based on measurement information 310.

LMF 131 may receive one or more measurement reports (e.g., measurement report 378) and determine a position of tag device 120 based on the one or more measurement reports. To illustrate, LMF 131 may determine position 369 of tag device 120 for which tag delay 239 is unknown to LMF 131. In some implementations, measurement report 378 may include a round trip time (RTT) associated with tag device 120 as generated by the reporting TRP. Additionally, LMF 131 may determine a position of tag device 120 by calculating the position based on a time difference of arrival (TDOA) technique. Thereafter, LMF 131 may perform one or more operations based on position 369 of tag device 120.

In some implementations, LMF 131 may transmit a position indicator that indicates position 369 of tag device 120. Additionally, or alternatively, once position 369 of tag device is determined, LMF 131 may calculate tag delay 368 of tag device 120.

In some implementations, LMF 131 may receive receiving multiple measurement reports (e.g., 378) associated with tag device 120. For example, the multiple measurement reports may include, for each TRP of multiple TRPs (e.g., 340-349), a measurement report of the TRP. LMF 131 may determine, based on the multiple measurement reports, position 369 of tag device 120 having tag delay 368 that is unknown to LMF 131. Tag delay 368 may include or correspond to a radio frequency group delay of one or more components of tag device 120. To determine position 369, LMF 131 determine a group of time difference values based on the multiple measurement reports. To illustrate, the multiple TRPs including a reference TRP (e.g., 340) and a group of TRPs (e.g., 342-349), and LMF 131 may determine, for each TRP of the multiple TRPs (e.g., 340-349), a measurement value based on the measurement report of the TRP. To determine the group of time difference values, LMF may, for each TRP of the group of TRPs (e.g., 342-349), subtract the measurement value of the reference TRP (e.g., 340) from the measurement value of the TRP to determine a difference value, and divide the difference value two to determine a quotient, the quotient includes a time different value of the group of time difference values. LMF 131 may calculate position 369 of tag device 120 based on the group of time difference values using a time difference of arrival technique.

In some implementations, the position of tag device 120 is determined using a roundtrip time (RTT) backscatter-based positioning technique or algorithm, such as a time difference of arrival (TDOA) technique. In some implementations, LMF 131 may select the RTT backscatter-based positioning technique or algorithm from multiple RTT backscatter-based positioning techniques or algorithms. To illustrate, LMF 131 may select the RTT backscatter-based positioning technique or algorithm based on tag device indicator 370, a tag capability, a TRP capability, network topology, environmental information (e.g., known structures or position of one or more devices), whether tag delay 368 is known or available, or a combination thereof, as illustrative, non-limiting examples.

Implementation or execution of the RTT backscatter-based positioning technique may involve multiple TRPs, such as TRPs 340-349. TRPs 340-349 may operate as Tx TRPs and Rx TRPs, may operate asynchronously, or a combination thereof. For example, LMF 131 configures TRPs 340-349 so that one or more of TRPs 340-349 transmit a respective PRS 374. TRPs 340-349 may transmit a PRS 374 to tag device 120, which may reflect backscatter signal 376 in response to receipt of PRS 374. TRPs 340-349 may use measurement gaps, configured by LMF 131, to generate and/or transmit measurement report(s) 378 to LMF 131. TRPs 340-349 may generate measurement information, determine one or more Tx or Rx times, calculate an RTT, or a combination thereof, and include in or indicate such information with measurement reports 378 transmitted to LMF 131. Based on the measurement reports 378, LMF 131 may determine position 369 of tag device 120.

In some implementations, one or more of TRPS 340-349 may simultaneously transmit PRS 374 in a tone level frequency domain multiplexed manner. Alternatively, one or more of TRPs 340-349 transmit a PRS sequentially in a time domain multiplexed (TDM) manner. In other implementations, a first group of TRPs, such as TRPs 340-342, simultaneously transmit PRS 374 using FDM, while a second group of TRPs, such as TRPS 346-349, transmit a PRS 374 using TDM. It is noted that at least one TRP may be included in the first group and the second group.

In some implementations, tag device 120 may generate tag device indicator 370 that indicates a tag capability. In some implementations, tag device 120 may receive a request and may generate tag device indicator 370 based on the request from LMF 131 or a TRP. The tag capability may or may not include a group delay. For example, tag device 120 may not be configured for tag delay reporting. Additionally, tag capability may include a tag type, a bandwidth, a positioning reference signal slot periodicity, a sensitivity, or a combination thereof.

In some implementations, a TRP, such as first TRP 340, may receive TRP configuration 372 associated with PRS 374 for tag device 120. In some implementations, each TRP of a group of TRPs is configured to operate as a Tx TRP and an Rx TRP during a positioning session with tag device 120. The TRP may receive backscatter signal 376 from tag device 120. Backscatter signal 376 may be is generated based on PRS 374. The TRP may transmit measurement report 378 based on backscatter signal 376. The measurement report may include or indicate an RTT of the TRP with the tag device 120. In some implementations, the TRP includes a pair of TRPs and the measurement report may include or indicate one or more Tx times or one or more Rx times based on a first positioning reference signal transmitted by a first TRP of a pair of TRPs, a first backscatter signal transmitted by tag device 120 based on the first positioning signal, a second positioning reference signal transmitted by a second TRP of the pair of TRPs, a second backscatter signal transmitted by tag device 120 based on the first positioning signal, or a combination thereof As described with reference to FIG. 3, the present disclosure provides techniques for supporting backscatter-based positioning. The techniques described facilitate determining position 369, such as a two dimensional or a three dimensional position, of a tag device, such as tag device 120, that has limited on-board power and computational resources (e.g., a passive or semi-passive tag). To illustrate, LMF 131 is able to provide TRP configuration 372 (e.g., PRS configuration 381) to one or more TRPs, such as TRPS 340-348, that accounts for particular characteristics of the tag device, such as limited on-board power or computational resources of the tag device. Additionally, LMF 131 is able to determine a position of tag device 120 based on one or more measurement reports 378 when a tag delay of tag device 120 is unknown or unavailable. For example, LMF 131 may perform TDoA backscatter-based positioning based measurements of multiple TRPS 340-349 when tag delay 368 of tag device is unknown or unavailable to a device that calculates position 369 of tag device 120.

Figure 4:
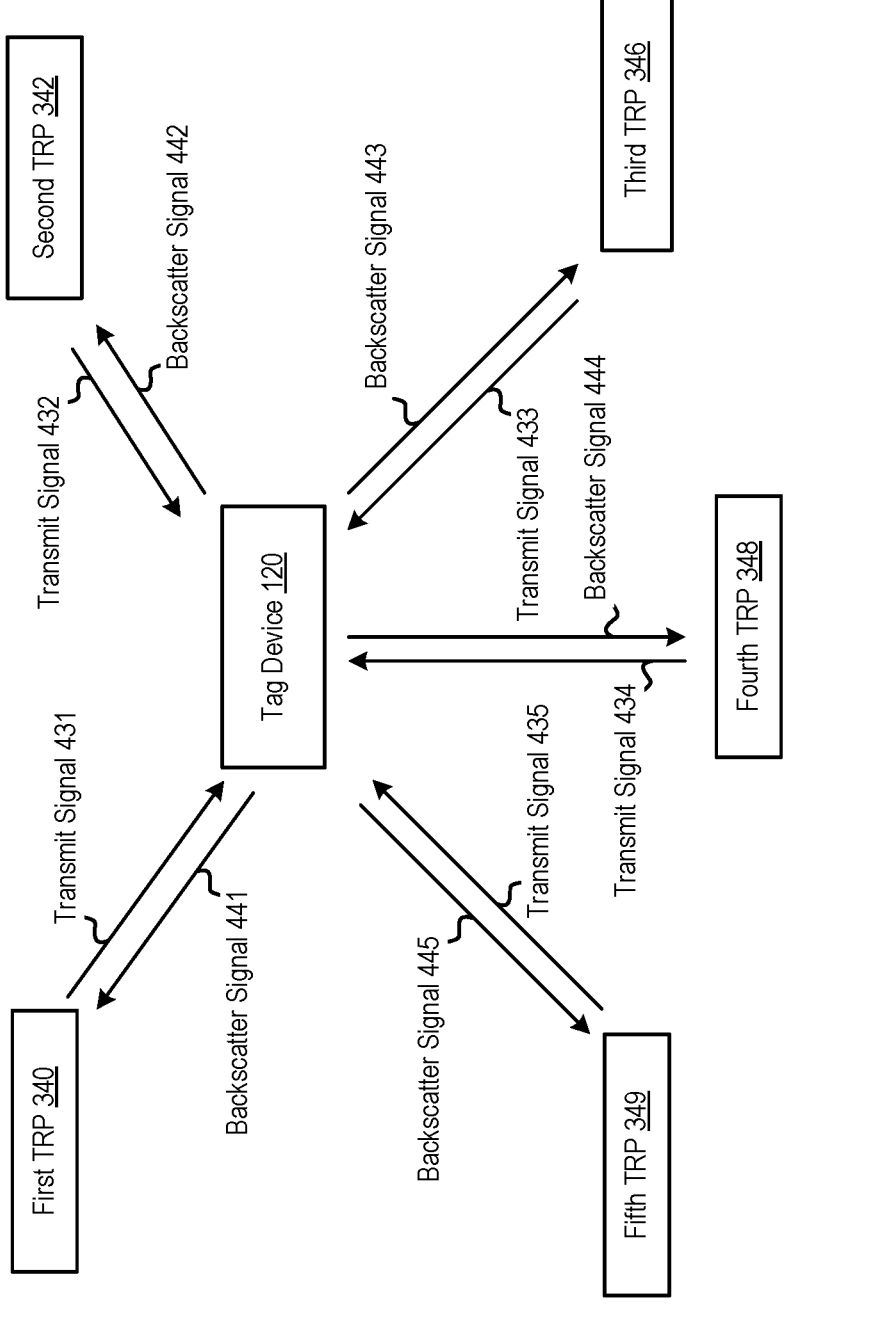
FIG. 4 is a block diagram of another example of a system supports backscatter-based positioning according to one or more aspects.

Referring to FIG. 4, FIG. 4 is a block diagram illustrating an example wireless communication system 400 that supports backscatter-based positioning according to one or more aspects. Wireless communication system 400 may include or correspond to wireless communication system 100 or 300. FIG. 4 depicts asynchronous operation of TRPs 340-349 in which backscatter-based positioning is used to determine a position of tag device 120. In particular, TRPs 340-349 may each transmit a respective PRS 531-535 and receive a respective backscatter signal 541-545 reflected from tag device 120 based on PRS 432-435. PRS 431-435 may include or correspond to PRS 374, and backscatter signal 441-445 may include or correspond to backscatter signal 376.

In some implementations, TRPs 340-349 transmit PRS 431-435 sequentially in a time domain multiplexed (TDM) manner to avoid interference. For example, PRS configuration 381, transmitted to one or more of TRPs 340-349 may include timing information to configure one or more TRPs 340-349 to transmit PRS 431-435 in an order. Accordingly, while TRPs 340-349 are not synchronized (e.g., lack a common clock), sequential transmission of PRS 431-435 and receipt of resulting backscatter signals is achieved by the one or more TRPs monitoring for another TRP's PRS and transmitting accordingly. Additionally, or alternatively, one or more TRPs 340-349 transmit PRS 431-435 simultaneously (e.g., transmission of at least two different PRSs at least partially overlap in time) in a frequency domain multiplexed (FDM) manner to avoid interference. For example, PRS configuration 381, transmitted to one or more TRPs 340-349 may include information to configure each of TRPs 340-349 to transmit PRS 431-435 at different frequencies from one another to avoid interference from simultaneous PRS transmission. To illustrate, PRS configuration 381 received at TRP 340 may configure first TRP 340 to generate and transmit PRS 431 at a first frequency, while PRS configuration 381 received at TRP 342 may configure TRP 342 to generate and transmit PRS 432 at a second frequency distinct from the first frequency. In this manner, at least one TRP of TRPS 340-349 may be configured to transmit PRS 431-435 at distinct non-overlapping frequencies to avoid interference and so that each of backscatter signals 441-445 will be reflected at unique, non-overlapping frequencies.

In some implementations, TRPs 340-349 are allocated to a first group, which includes a subset of TRPs 340-349, and a second group, including a different subset of TRPs 340-349 than the first group. The first group may be configured to operate according to TDM, as described above, while the second group may be configured to operate according to FDM, as described above. For example, a first group may include TRPs 340-348 that are configured to sequentially transmit PRS 431-434. A second group may include TRPs 348-349 configured to simultaneously transmit PRS at different frequencies, such that a frequency of PRS 434 is distinct from a frequency of PRS 435.

Figure 5:
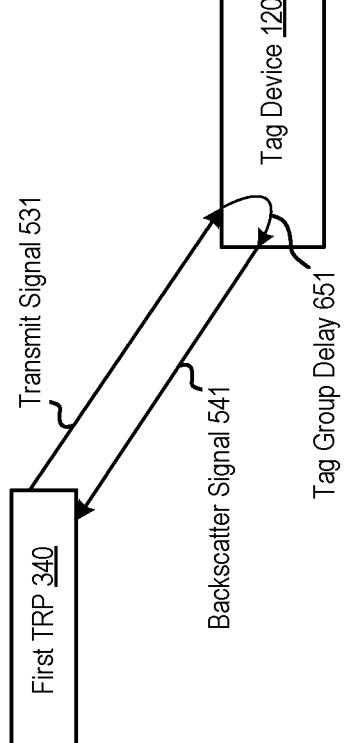
FIG. 5 is a block diagram of another example of a system that supports backscatter-based positioning according to one or more aspects.
Figure 5:

Referring to FIG. 5, FIG. 5 is a block diagram illustrating an example wireless communication system 500 that supports backscatter-based positioning according to one or more aspects. Wireless communication system 500 may include or correspond to wireless communication system 100, 300, or 400. FIG. 5 depicts full duplex operation of first TRPs 340 in which backscatter-based positioning is used to determine a position of tag device 120. In particular, first TRP 340 may transmit a transmit signal 531 and receive a respective backscatter signal 541 reflected from tag device 120 based on transmit signal 531. Transmit signal 531 may include or correspond to PRS 374 or 431, and backscatter signal 541 may include or correspond to backscatter signal 376 or 441.

Tag device 120 may receive transmit signal 531 and transmit backscatter signal 541. Between receipt of transmit signal 531 and transmission of backscatter signal 541 by tag device, transmit signal 531 may be reflected to generate backscatter signal 541 as indicated by tag group delay 651. For example, tag group delay 651 may include or correspond to tag delay 368. In some implementations, tag group delay 651 includes or is associated with an amount of time between tag device 120 receiving a positioning reference signal and transmitting a backscatter signal based on the received positioning reference signal. Additionally, or alternatively, tag group delay 651 may correspond to an amount of time that elapses, based on circuitry 351, transmitter 356, or receiver 358 of tag device 120, for tag device 120 to backscatter or process a received PRS and reflect the PRS as a backscatter signal.

In some implementations, first TRP 340 may determine a transmit time of transmit signal 531, a receive time of backscatter signal 541, an amount of time that elapses from transmission of transmit signal 531 to receipt of backscatter signal 541, or a combination thereof. First TRP 340 may store the transmit time, the receive time, the amount of time, or a combination thereof, as measurement information 310. Additionally, or alternatively, first TRP 340 may generate a measurement report (e.g., 378) that includes or indicates the transmit time, the receive time, the amount of time, or a combination thereof. In some implementations, a RTT may be based on a first duration (e.g., a first amount of time) corresponding to transmit signal 531, a second duration corresponding to tag group delay 651, and a third duration corresponding to backscatter signal 541.

In some implementations, tag device 120 does not know its tag group delay 651 or may not be configured to support tag delay reporting of its tag group delay 651. In some implementations, first TRP does not know tag group delay 651 of tag device 120, tag group delay 651 of tag device 120 is unavailable to first TRP 340, or a combination thereof.

Referring to at least FIGS. 4 and 5, backscatter-based positioning may involve at least one Tx TRP (e.g., TRP 340), that performs one or more functions of a reader (e.g., 121), multiple Rx TRPs (e.g., TRPs 340-348), and a tag device (e.g., 120) for which a position is to be determined through application of backscatter-based positioning. Estimates associated with a position of tag device 120 are obtained by measuring a round trip time (RTT) which is the sum of a first amount of time for PRS 374 to propagate from a Tx TRP, such as TRP 340, to tag device 120, a second amount of time for backscatter signal 376 to be reflected from tag device 120 to one or more TRPs (e.g., TRPs 340-349), and third amount of time indicating the tag delay. Tag delay corresponds to an amount of time that elapses, based on circuitry 351, transmitter 356, or receiver 358 of tag device 120, for tag device 120 to backscatter or process a received PRS and reflect the PRS as a backscatter signal.

The first amount of time for a PRS to propagate from a Tx TRP (e.g., TRP 340) to tag device 120 may be denoted as $\tau_{TRP\_x \to Tag\ Device}$, where the value of x denotes first TRP 340 (x=1), second TRP 342 (x=2), third TRP 346 (x=3), fourth TRP 348 (x=4), and fifth TRP 349 (x=5). The second amount of time for a backscatter signal to be reflected from tag device 120 to a TRP (e.g., TRPs 340-349) may be denoted as $\tau_{Tag\ Device \to TRP\_x}$. The third amount of time attributable to tag delay may be denoted as $T_{Tag\ Delay}$. For example, the amount of time for a backscatter signal to be reflected and transmitted by tag device 120 based on a received PRS may be denoted $\tau_{Tag\ Device \to TRP\_2}$. Accordingly, based on the above notation, a RTT for each TRP 340-349 may be:

$$\tau_{TRP\_1} = \tau_{TRP\_1 \to Tag\ Device} + \tau_{Tag\ Delay} + \tau_{Tag\ Device \to TRP_1},$$

$$\tau_{TRP\_2} = \tau_{TRP\_2 \to Tag\ Device} + \tau_{Tag\ Delay} + \tau_{Tag\ Device \to TRP\_2},$$

$$\tau_{TRP\_3} = T TRP\ 3 \to Tag\ Device + \tau_{Tag\ Delay} + \tau_{Tag\ Device \to TRP3},$$

$$\tau_{TRP\_4} = \tau_{TRP\_4 \to Tag\ Device} + \tau_{Tag\ Delay} + \tau_{Tag\ Device \to TRP\_4}, \text{and}$$

$$\tau_{TRP\_5} = \tau_{TRP\_5 \to Tag \quad Device} + \tau_{Tag \quad Delay} + \tau_{Tag \; Device \to TRP\_5}.$$

Based on the assumption that $\tau_{TRP_x \to Tag \quad Device} = \tau_{Tag \; Device \to TRP_x}$, the above equations may be rewritten as:

$$\tau_{TRP\_1} = 2(\tau_{TRP\_1 \to Tag \; Device}) + \tau_{Tag \; Delay},$$

$$\tau_{TRP\_2} = 2(\tau_{TRP\_2 \to Tag \; Device}) + \tau_{Tag \; Delay},$$

$$\tau_{TRP\_3} = 2(\tau_{TRP\_3 \to Tag \; Device}) + \tau_{Tag \; Delay},$$

$$\tau_{TRP\_4} = 2(\tau_{TRP\_4 \to Tag \; Device}) + \tau_{Tag \; Delay}, \text{ and}$$

$$\tau_{TRP\_5} = 2(\tau_{TRP\_5 \to Tag \; Device}) + \tau_{Tag \; Delay}.$$

Using RTT estimates from all TRPs, a position of tag device 120 may be determined using a multilateration method if the tag delay τ_tag (e.g., 368) is known. However, if the tag delay τ_tag (e.g., 368) is unknown or unavailable, another technique, such as a time difference of arrival technique may be used. To illustrate, a time difference value between two TRPs, such as first TRP 340 and second TRP 342, in which first TRP 340 is a reference TRP, may be determined as:

$$TD_{TRP_2 - TRP_1} = \frac{\tau_{TRP_2} - \tau_{TRP_1}}{2} =$$

$$\frac{\left(\left(2\left(\tau_{TRP_2 \to Tag \; Device}\right) + \tau_{Tag \; Delay}\right) - \left(2\left(\tau_{TRP_1 \to Tag \; Device}\right) + \tau_{Tag \; Delay}\right)\right)}{2} =$$

$$\frac{2\,\tau_{TRP_2 \to Tag \; Device} + 2\,\tau_{Tag \; Delay} - 2\,\tau_{TRP_1 \to Tag \; Device} + 2\,\tau_{Tag \; Delay}}{2} =$$

$$\frac{2\left(\tau_{TRP_2 \to Tag \; Device} - 2\,\tau_{TRP_1 \to Tag \; Device}\right)}{2} =$$

$$\tau_{TRP_2 \to Tag \; Device} - \tau_{TRP_1 \to Tag \; Device}.$$

It is noted that by subtracting measurements and dividing by 2, a time differential value results that may be used with a TDoA technique. It is also noted, that the tag delay τ_tag (e.g., 368) is canceled out after the subtraction operation. Accordingly, a time-error based on the tag delay τ_tag (e.g., 368) is mitigated in circumstances where the tag delay τ_tag (e.g., 368) is unknown or unavailable.

Likewise, additional time differences may be determined, such that:

$$TD_{TRP_2 - TRP_1} = \tau_{TRP_2 \to Tag \; Device} - \tau_{TRP_1 \to Tag \; Device},$$

$$TD_{TRP_3 - TRP_1} = \tau_{TRP_3 \to Tag \; Device} - \tau_{TRP_1 \to Tag \; Device},$$

$$TD_{TRP_4 - TRP_1} = \tau_{TRP_4 \to Tag \; Device} - \tau_{TRP_1 \to Tag \; Device}, \text{ and}$$

$$TD_{TRP_5 - TRP_1} = \tau_{TRP_5 \to Tag \; Device} - \tau_{TRP_1 \to Tag \; Device}.$$

In particular, $TD_{TRP_2 - TRP_1}$, $TD_{TRP_3 - TRP_1}$, $TD_{TRP_4 - TRP_1}$, $TD_{TRP_5 - TRP_1}$ are RTT values that are used in time difference of arrival (TDOA) techniques to obtain position 369 of tag device 120. To illustrate, to implement TDOA positioning, a device may be configured to perform the following TDOA positioning calculation:

$$\nabla \tau_{i,ref} = \tau_{Tag \; Device \to TRP_i} - \tau_{Tag \; Device \to TRP_{ref}} = \tau_i - \tau_{ref},$$

in which $TRP_{ref}$ is a reference TRP and $TRP_i$ is another TRP.

In some implementations, one or more devices, such as LMF 131, may be configured to determine an AoA through use of data included in measurement reports, such as measurement report 378. To illustrate, TRPs 340-349 may include directional antenna arrays and may be configured to determine an angle from which one or more backscatter signals, such as backscatter signal 376, is received. TRPs 340-349 may include the angle of receipt of the one or more backscatter signals in measurement report 378 transmitted to LMF 131. LMF 131 may then determine a AoA based on the angle of receipt data included in the one or more measurement reports.

Figure 6:
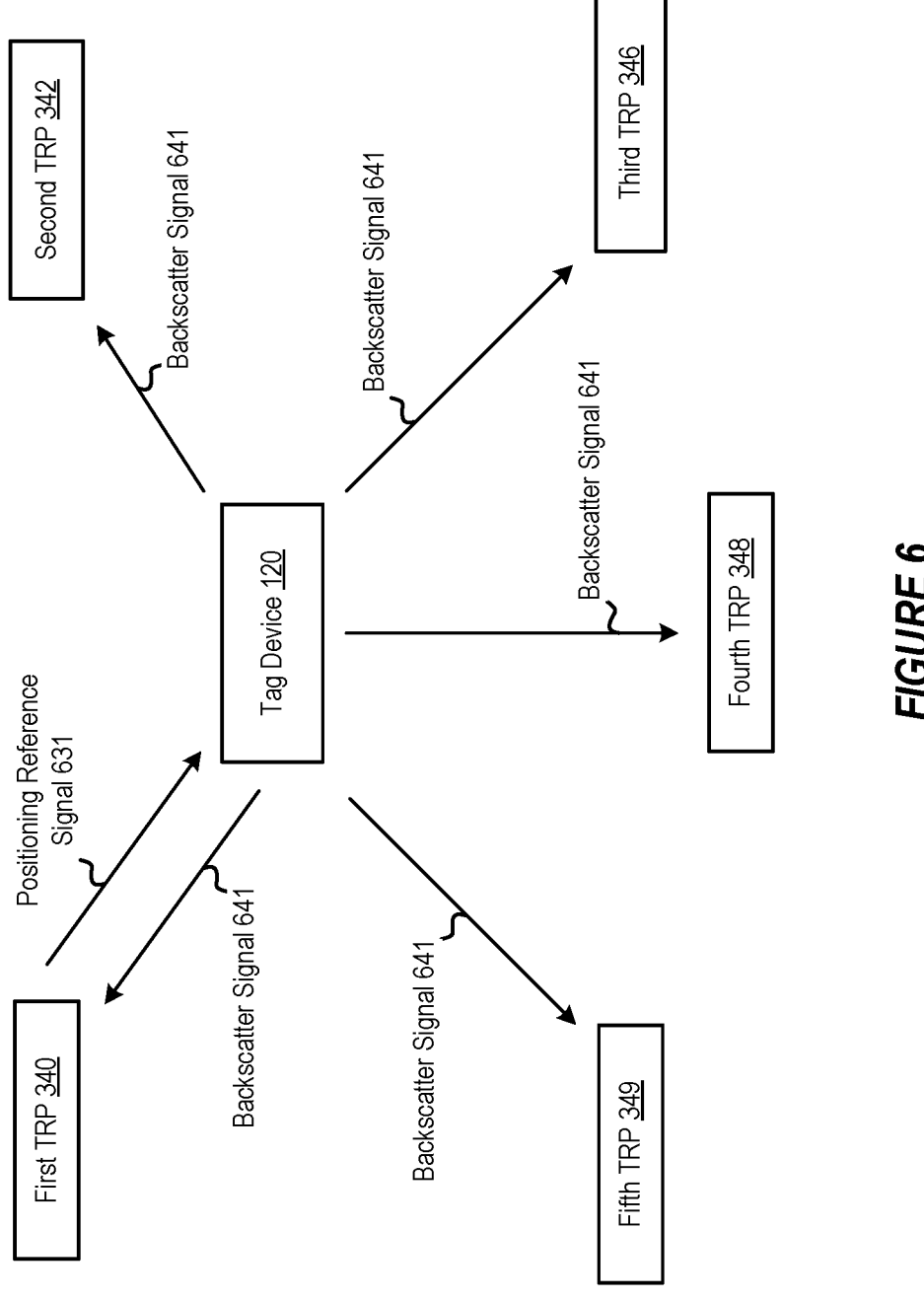
FIG. 6 is a block diagram of another example of a system that supports backscatter-based positioning according to one or more aspects.

Referring to FIG. 6, FIG. 6 is a block diagram illustrating an example wireless communication system 600 that supports backscatter-based positioning according to one or more aspects. Wireless communication system 600 may include or correspond to wireless communication system 100, 300, 400, or 500. FIG. 6 depicts asynchronous operation of TRPs 340-349 in which backscatter-based positioning may be used to determine a position of tag device 120. In particular, first TRP 340 may transmit a PRS 631 and one or more TRPs 340-349 may receive a respective backscatter signal 641 reflected from tag device 120 based on PRS 631. PRS 631 may include or correspond to PRS 374 or 431, and backscatter signal 641 may include or correspond to backscatter signal 376 or 441. In some implementations, one or more of TRPs 340-349 may or may not be configured to operate in full duplex operation. As shown in FIG. 6, first TRP 340 is configured to operate in full duplex operation and TRPs 342-349 are not configured to operate in full duplex operations.

During operation, first TRP 340 may transmit PRS 631 to tag device 120, and tag device 120 may reflect backscatter signal 441 to TRPs 340-349. TRPs 342-349 also may receive PRS 631. PRS 631 may include or correspond to PRS 374 and backscatter signal 641 may include or correspond to backscatter signal 376.

In some implementations, pairs of TRPs, such as TRPs 340 and 342, may be designated to facilitate backscatter-based positioning. For example, TRP 340 may transmit PRS 431 to tag device 120, and second TRP 342 may receive the reflected backscatter signal 441 transmitted by tag device 120. After receiving reflected backscatter signal 441, second TRP 342 may transmit a PRS, such as a second PRS not depicted in FIG. 6, to tag device 120, and tag device 120 may transmit another reflected backscatter signal (not shown) that is received by first TRP 340. First TRP 340 may transmit its Tx time and Rx time to second TRP 342 or LMF 131, or second TRP 342 may transmit its Tx time and Rx time to first TRP 340 or LMF 131. Additionally, or alternatively, first TRP 340 may receive the Tx and Rx time of second TRP 340 and may transmit its Tx time and Rx time, and the Tx time and Rx time of second TRP 340, to LMF 131. In this manner, transmit and/or receive times may be used for TDOA positioning techniques to determine position 369 of tag device 120. An example of a pair of TRPs is described further herein at least with reference to FIG. 7

While FIG. 6 depicts first TRP 340 as transmitting PRS 431, another TRP, such as second TRP 342 through fifth TRP 349, also may transmit a respective positioning reference signal that likewise can induce tag device 120 to generate a respective reflected backscatter signal that is received by one or more of first TRP 340 through fifth TRP 349.

Figure 7:
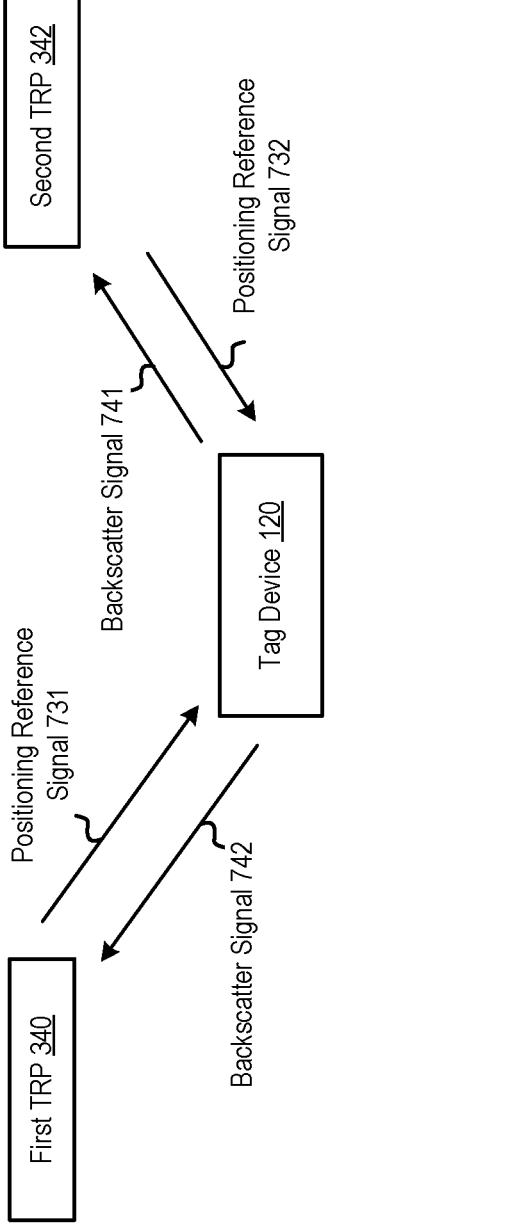
FIG. 7 is a block diagram of another example of a system that supports backscatter-based positioning according to one or more aspects.

Referring to FIG. 7, FIG. 7 is a block diagram illustrating an example wireless communication system 700 that supports backscatter-based positioning according to one or more aspects. Wireless communication system 700 may include or correspond to wireless communication system 100, 300, 400, 500, or 600. FIG. 7 depicts asynchronous operation of TRPs 340 and 342 in which backscatter-based positioning may be used to determine a position of tag device 120. In some implementations, first TRP 340 or second TRP 342 may not be configured to full duplex operation.

During operation, first TRP 340 may transmit PRS 731 to tag device 120. For example, PRS 731 may include or correspond to PRS 374. First TRP 340 may determine a Tx time of transmission of PRS 731. Based on PRS 731, tag device 120 may transmit backscatter signal 741. For example, backscatter signal 741 may include or correspond to backscatter signal 376. A tag group delay, such as tag delay 368 or tag group delay 651, may occur between receipt of PRS 731 and transmission of backscatter signal 741 by tag device 120.

Second TRP 342 may receive backscatter signal 741 and determine a Rx time of reception of backscatter signal 741. In response to receipt of backscatter signal 741, second TRP 342 may generate and transmit PRS 732. For example, PRS 732 may include or correspond to PRS 374. Second TRP 342 may determine a Tx time of transmission of PRS 732. In some implementations, second TRP 342 may include or indicate its Rx time and Tx time, or a difference between its Tx time and Rx time, in a measurement report (e.g., 378) that is transmitted to first TRP 340, LMF 131, or a combination thereof. In some implementations, the difference between the Tx time and the Rx time of second TRP 342 may be a TRP delay of second TRP 342.

Based on PRS 732, tag device 120 may transmit backscatter signal 742. For example, backscatter signal 742 may include or correspond to backscatter signal 376. A tag group delay may occur between receipt of PRS 732 and transmission of backscatter signal 742 by tag device 120.

First TRP 340 may receive backscatter signal 742 and determine a Rx time of reception of backscatter signal 742. In some implementations, first TRP 340 may include its Rx time and Tx time, or a different between its Tx time and Rx time, in a measurement report (e.g., 378) that is transmitted to second TRP 342, LMF 131, or a combination thereof. In implementations where first TRP receives a measurement report from second TRP 342 that includes or indicates the Tx time and Rx time of second TRP 342 (or a different between its Tx time and Rx time), first TRP 340 may include or indicate the measurement report (or information thereof) of second TRP 342 in the measurement report of first TRP 340.

and second TRP 342 may receive the reflected backscatter signal 741 transmitted by tag device 120. After receiving reflected backscatter signal 741, second TRP 342 may transmit a PRS 732 to tag device 120, and tag device 120 may transmit a backscatter signal 742 that is received by first TRP 340. In this manner, transmit and/or receive times may be used for TDOA positioning techniques to determine position 369 of tag device 120.

First TRP 340 may transmit its Tx time and Rx time to second TRP 342 or LMF 131, or second TRP 342 may transmit its Tx time and Rx time to first TRP 340 or LMF 131. Additionally, or alternatively, first TRP 340 may receive the Tx and Rx time of second TRP 340 and may transmit its Tx time and Rx time, and the Tx time and Rx time of second TRP 340, to LMF 131. In this manner, transmit and/or receive times may be used for TDOA positioning techniques to determine position 369 of tag device 120.

In some implementations, LMF 131 may select or identify multiple pairs of TRPs, such as a first pair that includes first TRP 340 and second TRP 342, a second pair that includes first TRP 340 and third TRP 346, a third pair that includes first TRP 340 and fourth TRP 348, and a fourth pair that includes first TRP 340 and fifth TRP 349. Referring to the first pair, a round trip time $RTT_{TRP_1\text{-}TRP_2}$ from transmission of a TRP by first TRP 340 to reception of a backscatter signal by first TRP 340 may be represented as:

$$RT_{TTRP_1\text{-}TRP_2} = \tau_{TRP\_1 \to Tag\ Device} + \tau_{Tag\ Delay} + \tau_{Tag\ Device \to TRP\_2} + \tau_{TRP_2Delay} + \tau_{TRP\_2 \to Tag\ Device} + \tau_{Tag\ Delay} + \tau_{Tag\ Device \to TRP_1}$$

Based on the assumption that $\tau_{TRP_x \to Tag\ Device} = \tau_{Tag\ Device \to TRP_x}$, the above equation may be rewritten as:

$$\tau_{TRP_1} = 2(\tau_{TRP_1 \to Tag\ Device} + \tau_{Tag\ Delay} + \tau_{TRP_2 \to Tag\ Device}) + \tau_{TRP_2Delay}$$

It is noted that $\tau_{TRP_1\text{-}TRP_2} = $Rx time at first TRP 340-Tx time at TRP 340, and $\tau_{TRP_2Delay} = $Tx time at second TRP 342-Rx time at second TRP 342. Accordingly, the above equation may be rewritten as:

$$\frac{(TRP1\ Rx\ \text{time} - TRP1\ Tx\ \text{time}) - (TRP2\ Tx\ \text{time} - TRP2\ Rx\ \text{time})}{2} =$$
$$\tau_{TRP_1 \to Tag\ Device} + \tau_{Tag\ Delay} + \tau_{TRP_2 \to Tag\ Device}$$

If $\tau_{1,2}$ is defined as $$\frac{(TRP1\ Rx\ \text{time} - TRP1\ Tx\ \text{time}) - (TRP2\ Tx\ \text{time} - TRP2\ Rx\ \text{time})}{2},$$

then $\tau_{1,2} = \tau_{TRP_1 \to Tag\ Device} + \tau_{Tag\ Delay} + \tau_{TRP_2 \to Tag\ Device}$.

Likewise, each of the second pair, third pair, and fourth pair may be represented as:

$$\tau_{1,3} = \tau_{TRP1 \to Tag\ Device} + \tau_{Tag\ Delay} + \tau_{TRP_3 \to Tag\ Device},$$

$$\tau_{1,4} = \tau_{TRP_1 \to Tag\ Device} + \tau_{Tag\ Delay} + \tau_{TRP_4 \to Tag\ Device},$$
and $$\tau_{1,5} = \tau_{TRP_1 \to Tag\ Device} + \tau_{Tag\ Delay} + \tau_{TRP_5 \to Tag\ Device}.$$

If the first pair $\tau_{1,2}$ is used as a reference TRP, a time difference value between the first pair and the second pair may be determined as:

$$\tau_{1,3} - \tau_{1,2} = \left(\tau_{TRP_1 \to Tag\ Device} + \tau_{Tag\ Delay} + \tau_{TRP_3 \to Tag\ Device}\right) -$$
$$\left(\tau_{TRP_1 \to Tag\ Device} + \tau_{Tag\ Delay} + \tau_{TRP_2 \to Tag\ Device}\right) =$$
$$\tau_{TRP_3 \to Tag\ Device} - \tau_{TRP_2 \to Tag\ Device}.$$

Likewise, additional time differences may be determined, such that:

$$\tau_{1,4} - \tau_{1,2} = \tau_{TRP_4 \to Tag\ Device} - \tau_{TRP_2 \to Tag\ Device}, \text{ and}$$

$$\tau_{1,5} - \tau_{1,2} = \tau_{TRP_5 \to Tag\ Device} - \tau_{TRP_2 \to Tag\ Device}.$$

The time differences may be used with TDOA positioning techniques to determine position 369 of tag device 120.

Figures 8, 9:
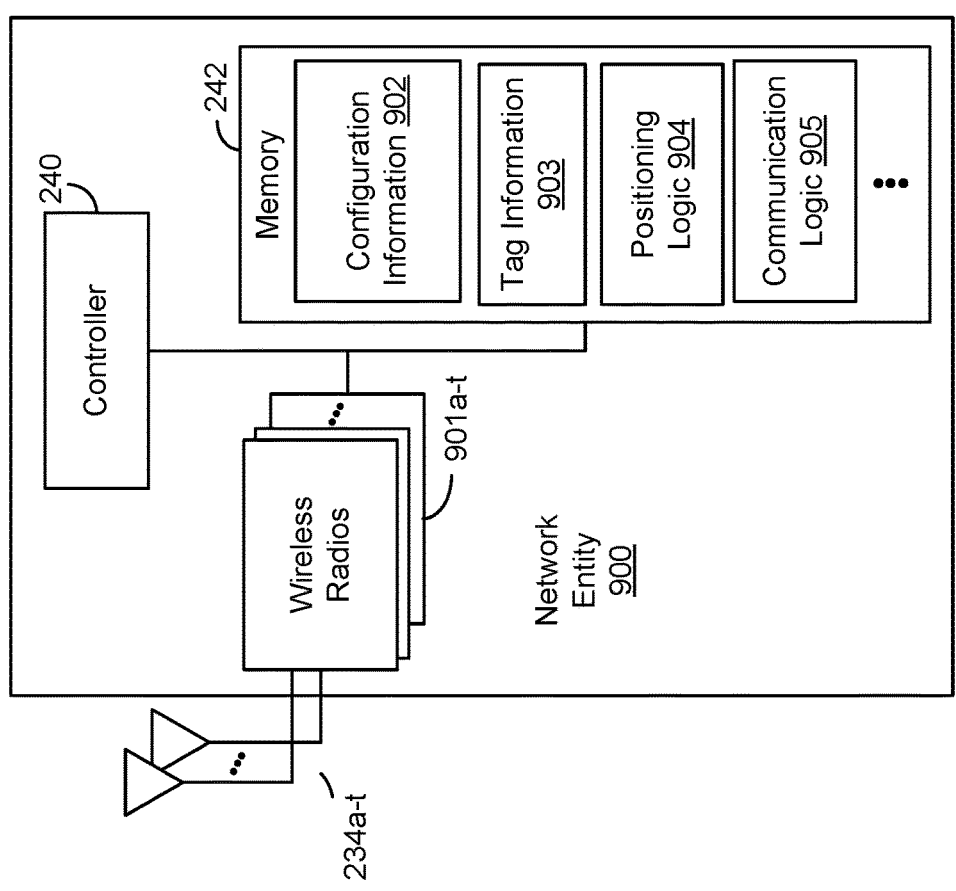
FIG. 8 is a flow diagram illustrating an example process that supports backscatter-based positioning according to one or more aspects.
FIG. 9 is a block diagram of an example network entity that supports backscatter-based positioning according to one or more aspects.

FIG. 8 is a flow diagram illustrating an example process 800 that supports backscatter-based positioning according to one or more aspects. Operations of process 800 may be performed by a network entity, such as base station 105, UE 115, LMF 131, reader device 121, TRP 340, 342, 346, 348, or 349, or a network entity as described above with reference to FIG. 9. For example, example operations of process 800 may enable the network entity to support backscatter-based positioning.

At block 802, the network entity receives multiple measurement reports associated with a tag device. For example, the multiple measurement reports may include or correspond to measurement information 310 or measurement report 378. In some implementations, for each TRP of multiple TRPs, the measurement report of the TRP is based on positioning signaling between the TRP and the tag device. The tag device may include or correspond to tag device 120. In some implementations, the tag device does not support tag delay reporting. The multiple measurement reports may include, for each TRP of multiple TRPs, a measurement report of the TRP. The multiple TRPs may include a TRP 340, 342, 346, 348, or 349. In some implementations, the multiple TRPs are unsynchronized. For example, at least one TRP of the multiple TRPs is unsynchronized with the other TRPs of the multiple TRPs.

At block 804, the network entity determines, based on the multiple measurement reports, a position of the tag device having a tag delay that is unknown to the network entity. For example, the position may include or correspond to position 369. The tag delay may include or correspond to tag delay 368. In some implementations, the network entity calculates the position while the tag delay is unknown to the network entity. Additionally, or alternatively, the network entity may determine the tag delay value is unknown to the network entity.

In some implementations, the tag delay may include or be a radio frequency group delay of one or more components of the tag device. The one or more components may include or correspond to circuitry 351, transmitter 356, receiver 358, or a combination thereof. The one or more components are configured to receive a positioning reference signal, generate a backscatter signal based on the positioning reference signal, and transmit the backscatter signal. For example, the positioning reference signal may include or correspond to PRS 374. The backscatter signal may include or correspond to backscatter signal 376.

In some implementations, the network entity identifies the tag device for a positioning session. The tag device may include a passive tag device or a semi-passive tag device. Additionally, or alternatively, the network entity may the multiple TRPs from a plurality of TRPs.

In some implementations, the network entity may transmit a TRP configuration. The TRP configuration may include or correspond to PRS information 307, measurement gap information 308, TRP configuration 372, PRS configuration 381, or MG configuration 382. In some implementations, the TRP configuration indicates a repetition of a positioning reference signal, a bandwidth configuration, a comb pattern configuration, or a combination thereof. Additionally, or alternatively, for each TRP of the multiple TRPs, the TRP configuration may indicate a frequency of the positioning reference signal of the TRP, an order of positioning session of TRPs of the group of unsynchronized TRPs, or a combination thereof.

In some implementations, the TRP configuration indicates that a first TRP performs first positioning signaling and a second TRP performs second positioning signaling. In some implementations, the second positioning signaling is performed after the first positioning signaling. Additionally, or alternatively, the first positioning signaling may be associated with a first frequency band and is performed concurrently with the second positioning signaling that is associated with a second frequency band that is distinct from the first frequency band.

In some implementations, for each TRP of multiple TRPs, the measurement report of the TRP indicates a value associated with a first propagation time associated with a transmit signal transmitted from the TRP, a second propagation time associated with a receive signal received from the tag device, or a combination thereof. For example, for each TRP of multiple TRPs, the measurement report may indicate a value associated with or that represents a first propagation time from the TRP to the tag device, the tag delay of the tag device, and a second propagation time from the tag device to the TRP. In some implementations, the first propagation time is equal to the second propagation time. The first propagation time may be different from the second propagation time if the tag device or the TRP is moving.

In some implementations, each TRP of the multiple TRPs, the TRP is configured for full duplex operation to perform the positioning signaling. In some such implementations, for each TRP of multiple TRPs, the value of the measurement report of the TRP indicates an RTT. In other implementations, at least one TRP of the multiple TRPs is not configured for full duplex operations. In some such implementations, each TRP of the multiple TRPs includes a pair of TRPs having the TRP as a first TRP of the pair of TRPs and a same TRP as a second TRP of the pair of TRPs.

In some implementations, the multiple TRPs including a reference TRP and a group of TRPs. The network entity may select a first TRP of the multiple TRPs as the reference TRP.

In some implementations, the network entity determines a group of time difference values based on the multiple TRPs. To illustrate, for each TRP of the multiple TRPs, the network entity may determine a measurement value based on the measurement report of the TRP. To determine the group of time difference values, for each TRP of the group of TRPs, the network entity may subtract the measurement value of the reference TRP from the measurement value of the TRP to determine a difference value, and divide the difference value two to determine a quotient. The quotient may include or be a time different value of the group of time difference values. Additionally, the network entity may calculate the position of the tag device based on the group of time difference values. The position may be determined based on a time difference of arrival technique using the group of time difference values. To illustrate, the position may be determined using a time difference of arrival technique based on a determination that the tag delay value is unknown to the network entity. In some implementations, the network entity may determine the tag delay of the tag device based on the position of the tag device.

FIG. 9 is a block diagram of an example network entity 900 that supports backscatter-based positioning according to one or more aspects. Network entity 900 may be configured to perform operations, including the blocks of process 800 described with reference to FIG. 8. In some implementations, network entity 900 includes the structure, hardware, and components shown and described with reference to base station 105, UE 115, LMF 131, reader device 121, or TRP 340, 342, 346, 348, or 349. For example, network entity 900 may include controller 240, which operates to execute logic or computer instructions stored in memory 242, as well as controlling the components of network entity 900 that provide the features and functionality of network entity 900. Network entity 900, under control of controller 240, is configured to transmit and receive signals via wireless radios 901*a-t* and antennas 234*a-t*. Wireless radios 901*a-t* include various components and hardware, as illustrated in FIG. 2 for base station 105, including modulator and demodulators 232*a-t*, transmit processor 220, TX MIMO processor 230, MIMO detector 236, and receive processor 238.

As shown, the memory 242 may include tag information 902, configuration logic 903, positioning logic 904, and communication logic 905. Tag information 902 may include or correspond to tag device information 309, tag delay 368, position 369, tag device indicator 370, or a combination thereof. Configuration logic 903 may be configured to generate one or more configurations or configuration data, such as TRP configuration 372, PRS configuration 381, MG configuration 382, a tag device configuration, or a combination thereof. Positioning logic 904 may be configured to determine a position of a tag device, such as position 369 of tag device 120. Communication logic 905 may be configured to enable communication between network entity 900 and one or more other devices. Network entity 900 may receive signals from or transmit signals to one or more other devices, such as UE 115, base station 105, tag device 120, reader device 121, core network 130, LMF 131, or TRP 340, 342, 346, 348, or 349.

It is noted that one or more blocks (or operations) described with reference to FIG. 8 may be combined with one or more blocks (or operations) described with reference to another of the figures. For example, one or more blocks (or operations) of FIG. 8 may be combined with one or more blocks (or operations) of FIGS. 4-7. As another example, one or more blocks associated with FIG. 8 may be combined with one or more blocks associated with FIGS. 1-3. Additionally, or alternatively, one or more operations described above with reference to FIG. 1-3 or 8 may be combined with one or more operations described with reference to FIG. 9.

In one or more aspects, techniques for supporting backscatter-based positioning may include additional aspects, such as any single aspect or any combination of aspects described below or in connection with one or more other processes or devices described elsewhere herein. In a first aspect, techniques for supporting backscatter-based positioning may include receiving multiple measurement reports associated with a tag device. The multiple measurement reports include, for each TRP of multiple TRPs, a measurement report of the TRP. The techniques may further include determining, based on the multiple measurement reports, a position of the tag device having a tag delay that is unknown to the network entity. In some examples, the techniques in the first aspect may be implemented in a method or process. In some other examples, the techniques of the first aspect may be implemented in a wireless communication device, which may include a network entity or a component of a network entity. For example, the wireless communication device, such as the network entity, may include or correspond to a UE, a base station, a core network, an LMF, a reader device, or a TRP. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a second aspect, in combination with the first aspect, the tag delay includes a radio frequency group delay of one or more components of the tag device.

In a third aspect, in combination with the second aspect one or more components are configured to receive a positioning reference signal, generate a backscatter signal based on the positioning reference signal, and transmit the backscatter signal.

In a fourth aspect, in combination with one or more of the first aspect through the third aspect, the tag device is not configured to support tag delay reporting.

In a fifth aspect in combination with one or more of the first aspect through the fourth aspect, the techniques further include calculating the position while the tag delay is unknown to the network entity.

In a sixth aspect, in combination with one or more of the first aspect through the fifth aspect, the techniques further include determining the tag delay of the tag device based on the position of the tag device.

In a seventh aspect, in combination with one or more of the first aspect through the sixth aspect, the techniques further include determining that the tag delay value is unknown to the network entity.

In an eighth aspect, in combination with one or more of the first aspect through the seventh aspect, the position is determined using a time difference of arrival technique based on a determination that the tag delay value is unknown to the network entity.

In a ninth aspect, in combination with one or more of the first aspect through the eighth aspect, the techniques further include identifying the tag device for a positioning session; and In a tenth aspect, in combination with one or more of the first aspect through the ninth aspect, the techniques further include identifying the multiple TRPs from a plurality of TRPs.

In an eleventh aspect, in combination with one or more of the first aspect through the tenth aspect, the tag device includes a passive tag device or a semi-passive tag device.

In a twelfth aspect, in combination with one or more of the first aspect through the eleventh aspect, at least one TRP of the multiple TRPs is unsynchronized with the other TRPs of the multiple TRPs.

In a thirteenth aspect, in combination with one or more of the first aspect through the twelfth aspect, for each TRP of multiple TRPs, the measurement report of the TRP is based on positioning signaling between the TRP and the tag device.

In a fourteenth aspect, in combination with one or more of the first aspect through the thirteenth aspect, the techniques further include transmitting a TRP configuration, the TRP configuration indicates that a first TRP performs first positioning signaling and a second TRP performs second positioning signaling.

In a fifteenth aspect, in combination with the fourteenth aspect, the TRP configuration indicates the second positioning signaling is performed after the first positioning signaling.

In a sixteenth aspect, in combination with the fifteenth aspect or the sixteenth aspect, the first positioning signaling is associated with a first frequency band and is performed concurrently with the second positioning signaling that is associated with a second frequency band that is distinct from the first frequency band.

In a seventeenth aspect, in combination with the fifteenth aspect or the sixteenth aspect, the TRP configuration indicates a repetition of a positioning reference signal, a bandwidth configuration, a comb pattern configuration, or a combination thereof.

In an eighteenth aspect, in combination with one or more of the fifteenth aspect through the seventeenth aspect, for each TRP of the multiple TRPs, the TRP configuration indicates: a frequency of the positioning reference signal of the TRP; an order of positioning session of TRPs of the multiple TRPs; or a combination thereof.

In a nineteenth aspect, in combination with one or more of the first aspect through the eighteenth aspect, for each TRP of multiple TRPs, the measurement report of the TRP indicates a value associated with a first propagation time associated with a transmit signal transmitted from the TRP, a second propagation time associated with a receive signal received from the tag device, or a combination thereof.

In a twentieth aspect, in combination with one or more of the first aspect through the eighteenth aspect, for each TRP of multiple TRPs, the measurement report indicates a value associated with a first propagation time from the TRP to the tag device, the tag delay of the tag device, and a second propagation time from the tag device to the TRP.

In a twenty-first aspect, in combination with the twentieth aspect, the first propagation time is equal to the second propagation time.

In a twenty-second aspect, in combination with one or more of the first aspect through the twenty-first aspect, for each TRP of multiple TRPs, the value of the measurement report of the TRP indicates an RTT.

In a twenty-third aspect, in combination with one or more of the first aspect through the twenty-second aspect, each TRP of the multiple TRPs, the TRP is configured for full duplex operation to perform the positioning signaling.

In a twenty-fourth aspect, in combination with one or more of the first aspect through the nineteenth aspect, each TRP of the multiple TRPs includes a pair of TRPs having the TRP as a first TRP of the pair of TRPs and a same TRP as a second TRP of the pair of TRPs.

In a twenty-fifth aspect, in combination with one or more of the first aspect through the twenty-fourth aspect, the multiple TRPs including a reference TRP and a group of TRPs.

In a twenty-sixth aspect, in combination with the twenty-fifth aspect, the techniques further include selecting a first TRP of the multiple TRPs as the reference TRP.

In a twenty-seventh aspect, in combination with the twenty-fifth aspect or the twenty-sixth aspect, the techniques further include determining a group of time difference values based on the multiple TRPs.

In a twenty-eighth aspect, in combination with the twenty-seventh aspect, the techniques further include, for each TRP of the multiple TRPs, determining a measurement value based on the measurement report of the TRP.

In a twenty-ninth aspect, in combination with the twenty-eighth aspect, to determine the group of time difference values, the techniques further include, for each TRP of the group of TRPs, subtracting the measurement value of the reference TRP from the measurement value of the TRP to determine a difference value.

In a thirtieth aspect, in combination with the twenty-ninth aspect, to determine the group of time difference values, the techniques further include, for each TRP of the group of TRPs, dividing the difference value two to determine a quotient.

In a thirty-first aspect, in combination with the thirtieth aspect, the quotient includes a time different value of the group of time difference values.

In a thirty-second aspect, in combination with one or more of the twenty-seventh aspect through the thirty-first aspect, the techniques further include calculating the position of the tag device based on the group of time difference values.

In a thirty-third aspect, in combination with one or more of the twenty-seventh through the thirty-second aspect, the position is determined based on a time difference of arrival technique using the group of time difference values.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a network entity, the method comprising:

transmitting a transmission/reception point (TRP) configuration, wherein the TRP configuration indicates:

a first TRP performs a backscatter-based first positioning signaling and a second TRP performs a backscatter-based second positioning signaling, and the backscatter-based first positioning signaling is associated with a first frequency band and is performed concurrently with the backscatter-based second positioning signaling that is associated with a second frequency band that is distinct from the first frequency band;

receiving multiple measurement reports associated with a tag device, the multiple measurement reports including, for each TRP of multiple TRPs, a measurement report of the TRP; and determining, based on the multiple measurement reports, a position of the tag device having a tag delay that is unknown to the network entity.

2. The method of claim 1, wherein:

the tag delay includes a radio frequency group delay of one or more components of the tag device;

the one or more components are configured to receive a positioning reference signal, generate a backscatter signal based on the positioning reference signal, and transmit the backscatter signal; and the position of the tag device is determined while the tag delay is unknown to the network entity.

3. The method of claim 1, wherein:

at least one TRP of the multiple TRPs is unsynchronized with the other TRPs of the multiple TRPs.

4. The method of claim 1, wherein:

for each TRP of multiple TRPs, the measurement report of the TRP indicates a value associated with a first propagation time associated with a transmit signal transmitted from the TRP, a second propagation time associated with a receive signal received from the tag device, or a combination there.

5. The method of claim 1, wherein:

for each TRP of multiple TRPs, the measurement report indicates a value associated with a first propagation time from the TRP to the tag device, the tag delay of the tag device, and a second propagation time from the tag device to the TRP.

6. The method of claim 1, wherein:

for each TRP of multiple TRPs, a value of the measurement report of the TRP indicates a round trip time (RTT).

7. The method of claim 1, wherein:

for each TRP of the multiple TRPs, the TRP is configured for full duplex operation to perform the backscatter-based positioning signaling.

8. The method of claim 1, wherein:

each TRP of the multiple TRPs includes a pair of TRPs having the TRP as a first TRP of the pair of TRPs and a same TRP as a second TRP of the pair of TRPs.

9. The method of claim 1, further comprising:

selecting a first TRP of the multiple TRPs as a reference TRP, and wherein the multiple TRPs including the reference TRP and a group of TRPs.

10. The method of claim 9, further comprising:

determining a group of time difference values based on the multiple TRPs, and wherein the multiple TRPs including a reference TRP and a group of TRPs.

11. The method of claim 10, further comprising:

for each TRP of the multiple TRPs, determining a measurement value based on the measurement report of the TRP; and to determine the group of time difference values, for each TRP of the group of TRPs:

subtracting the measurement value of the reference TRP from the measurement value of the TRP to determine a difference value; and dividing the difference value two to determine a quotient, the quotient includes a time different value of the group of time difference values.

12. The method of claim 10, further comprising:

calculating the position of the tag device based on the group of time difference values, and wherein the position is calculated using a time difference of arrival technique.

13. A network entity comprising:

a memory storing processor-readable code; and at least one processor coupled to the memory, the at least one processor configured to execute the processor-readable code to cause the at least one processor to:

transmit a transmission/reception point (TRP) configuration, and wherein the TRP configuration indicates:

a first TRP performs a backscatter-based first positioning signaling and a second TRP performs a backscatter-based second positioning signaling, and the backscatter-based first positioning signaling is associated with a first frequency band and is performed concurrently with the backscatter-based second positioning signaling that is associated with a second frequency band that is distinct from the first frequency band;

receive multiple measurement reports associated with a tag device, the multiple measurement reports including, for each TRP of multiple TRPs, a measurement report of the TRP; and determine, based on the multiple measurement reports, a position of the tag device having a tag delay that is unknown to the network entity.

14. The network entity of claim 13, wherein:

the tag delay includes a radio frequency group delay of one or more components of the tag device;

the one or more components are configured to receive a positioning reference signal, generate a backscatter signal based on the positioning reference signal, and transmit the backscatter signal; and the position of the tag device is determined while the tag delay is unknown to the network entity.

15. The network entity of claim 13, wherein:

for each TRP of multiple TRPs, a value of the measurement report of the TRP indicates a round trip time (RTT).

16. The network entity of claim 13, wherein, for each TRP of the multiple TRPs, the TRP is configured for full duplex operation to perform the backscatter-based positioning signaling.

17. The network entity of claim 13, wherein:
each TRP of the multiple TRPs includes a pair of TRPs having the TRP as a first TRP of the pair of TRPs and a same TRP as a second TRP of the pair of TRPs.

18. The network entity of claim 13, wherein:
the at least one processor is further configured to execute the processor-readable code to cause the at least one processor to:
  select a first TRP of the multiple TRPs as the reference TRP; and
  determine a group of time difference values based on the multiple TRPs, and
  wherein the multiple TRPs including a reference TRP and a group of TRPs.

19. The network entity of claim 18, wherein the at least one processor is further configured to execute the processor-readable code to cause the at least one processor to:
  for each TRP of the multiple TRPs, determine a measurement value based on the measurement report of the TRP; and
  to determine the group of time difference values, for each TRP of the group of TRPs:
    subtract the measurement value of the reference TRP from the measurement value of the TRP to determine a difference value; and
    divide the difference value two to determine a quotient, the quotient includes a time different value of the group of time difference values.

20. The network entity of claim 19, wherein:
the at least one processor is further configured to execute the processor-readable code to cause the at least one processor to calculate a position of the tag device based on the group of time difference values, and
the position is calculated using a time difference of arrival technique.

21. A apparatus for wireless communication, the apparatus comprising:
means for transmitting a transmission/reception point (TRP) configuration, and wherein the TRP configuration indicates:
  a first TRP performs a backscatter-based first positioning signaling and a second TRP performs a backscatter-based second positioning signaling, and
  the backscatter-based first positioning signaling is associated with a first frequency band and is performed concurrently with the backscatter-based second positioning signaling that is associated with a second frequency band that is distinct from the first frequency band;
means for receiving multiple measurement reports associated with a tag device, the multiple measurement reports including, for each TRP of multiple TRPs, a measurement report of the TRP; and
means for determining, based on the multiple measurement reports, a position of the tag device having a tag delay that is unknown to the network entity.

22. The apparatus of claim 21, wherein:
the tag delay includes a radio frequency group delay of one or more components of the tag device;
the one or more components are configured to receive a positioning reference signal, generate a backscatter signal based on the positioning reference signal, and transmit the backscatter signal; and
the position of the tag device is determined while the tag delay is unknown to the network entity.

23. The apparatus of claim 21, wherein:
for each TRP of the multiple TRPs, the TRP is configured for full duplex operation to perform the backscatter-based positioning signaling; or
each TRP of the multiple TRPs includes a pair of TRPs having the TRP as a first TRP of the pair of TRPs and a same TRP as a second TRP of the pair of TRPs.

24. The apparatus of claim 21, further comprising:
means for selecting a first TRP of the multiple TRPs as the reference TRP; and
means for determining a group of time difference values based on the multiple TRPs, and
wherein the multiple TRPs including a reference TRP and a group of TRPs.

25. The apparatus of claim 24, further comprising:
means for determining, for each TRP of the multiple TRPs, a measurement value based on the measurement report of the TRP; and
the means for determining includes:
  means for subtracting, for each TRP of the group of TRPs, the measurement value of the reference TRP from the measurement value of the TRP to determine a difference value; and
  means for dividing, for each TRP of the group of TRPs, the difference value two to determine a quotient, the quotient includes a time different value of the group of time difference values.

26. A non-transitory computer-readable medium stores instructions that, when executed by a processor, cause the processor to perform operations:
transmitting a transmission/reception point (TRP) configuration, and wherein the TRP configuration indicates:
  a first TRP performs a backscatter-based first positioning signaling and a second TRP performs a backscatter-based second positioning signaling, and
  the backscatter-based first positioning signaling is associated with a first frequency band and is performed concurrently with the backscatter-based second positioning signaling that is associated with a second frequency band that is distinct from the first frequency band;
receiving multiple measurement reports associated with a tag device, the multiple measurement reports including, for each TRP of multiple TRPs, a measurement report of the TRP; and
determining, based on the multiple measurement reports, a position of the tag device having a tag delay that is unknown to the network entity.

27. The non-transitory computer-readable medium of claim 26, wherein:
the tag delay includes a radio frequency group delay of one or more components of the tag device;
the one or more components are configured to receive a positioning reference signal, generate a backscatter signal based on the positioning reference signal, and transmit the backscatter signal; and
the position of the tag device is determined while the tag delay is unknown to the network entity.

28. The non-transitory computer-readable medium of claim 26, wherein the operations further include:
selecting a first TRP of the multiple TRPs as the reference TRP; and
determining a group of time difference values based on the multiple TRPs, and
wherein the multiple TRPs including a reference TRP and a group of TRPs.

29. The non-transitory computer-readable medium of claim 28, wherein the operations further include:

for each TRP of the multiple TRPs, determining a measurement value based on the measurement report of the TRP; and to determine the group of time difference values, for each TRP of the group of TRPs:

subtracting the measurement value of the reference TRP from the measurement value of the TRP to determine a difference value; and dividing the difference value two to determine a quotient, the quotient includes a time different value of the group of time difference values.

* * * * *